(12) United States Patent  
Essabar

(10) Patent No.: US 7,515,881 B2  
(45) Date of Patent: Apr. 7, 2009

(54) RESONANCE FREQUENCY SHIFT CANCELING IN WIRELESS HEARING AIDS

(75) Inventor: Mohamad Essabar, Copenhagen (DK)

(73) Assignee: Starkey Laboratories, Inc., Eden Prairie, MN (US)

( * ) Notice: Subject to any disclaimer, the term of this patent is extended or adjusted under 35 U.S.C. 154(b) by 1160 days.

(21) Appl. No.: 10/723,855

(22) Filed: Nov. 26, 2003

(65) Prior Publication Data

US 2005/0111681 A1   May 26, 2005

(51) Int. Cl.
*H04B 1/44* (2006.01)

(52) U.S. Cl. ............................ 455/78; 455/77; 455/83; 455/87; 455/90.3; 381/331; 381/315; 381/322

(58) Field of Classification Search ................... 455/78, 455/77, 83, 87, 90.3; 381/331, 315, 322, 381/326, 327, 328  
See application file for complete search history.

(56) References Cited

U.S. PATENT DOCUMENTS

| | | | |
|---|---|---|---|
| 4,864,633 A | | 9/1989 | Chatelot |
| 5,697,069 A | * | 12/1997 | Bohm et al. ................... 455/83 |
| 6,272,321 B1 | | 8/2001 | Bruhnke et al. |
| 6,348,897 B1 | | 2/2002 | Alameh et al. |
| 6,392,610 B1 | | 5/2002 | Braun et al. |
| 6,542,777 B1 | | 4/2003 | Griffith et al. |
| 6,559,811 B1 | | 5/2003 | Pulimi et al. |
| 6,590,541 B1 | | 7/2003 | Schultze |
| 6,798,304 B2 | * | 9/2004 | Gomez ................. 331/116 FE |
| 6,801,192 B2 | | 10/2004 | Fujitsuka et al. |
| 7,099,486 B2 | * | 8/2006 | Julstrom et al. ............. 381/331 |
| 2002/0000937 A1 | | 1/2002 | Kozakai |
| 2002/0160722 A1 | | 10/2002 | Terranova et al. |
| 2003/0176174 A1 | | 9/2003 | Seppinen et al. |
| 2004/0085145 A1 | * | 5/2004 | Dinn et al. .............. 331/117 R |
| 2004/0140360 A1 | | 7/2004 | Deguschi et al. |
| 2004/0233043 A1 | | 11/2004 | Yazawa et al. |
| 2005/0008147 A1 | * | 1/2005 | Lee ........................... 379/431 |
| 2005/0033383 A1 | | 2/2005 | Ibrahim et al. |
| 2005/0059375 A1 | | 3/2005 | Abe et al. |

FOREIGN PATENT DOCUMENTS

GB        2321726        8/1998

OTHER PUBLICATIONS

"International Search Report for corresponding PCT Application No. PCT/US2004/039609", (Feb. 23, 2005), 4 pgs.

* cited by examiner

*Primary Examiner*—Tuan A Pham  
(74) *Attorney, Agent, or Firm*—Schwegman, Lundberg & Woessner, P.A.

(57) ABSTRACT

Systems, devices and methods are provided to switch between transmit and receive modes in wireless hearing aids. Various aspects of the present subject matter relate to a communication system. Various embodiments of the communication system include an antenna with a resonant circuit having an inductive coil connected to a tuning capacitor. The communication system includes means to selectively drive the resonant circuit during a transmit mode, and means to selectively receive an induced signal in the resonant circuit during a receive mode. The communication system further includes means to selectively include a frequency shift canceling component in the resonant circuit to provide a first resonance frequency in the resonant circuit in the transmit mode and a second resonance frequency in the resonant circuit in the receive mode such that the first resonance frequency and the second resonance frequency are approximately equal. Other aspects are provided herein.

29 Claims, 17 Drawing Sheets

RESONANCE FREQUENCY SHIFT CANCELING IN WIRELESS HEARING AIDS

TECHNICAL FIELD

This application relates generally to communication systems, and, more particularly, to systems, devices and methods for canceling a resonance frequency shift when a wireless communication system, such as those used in wireless hearing aids, switch between transmit and receive modes.

BACKGROUND

Some wireless communication systems include a transmit-receive switch, hereinafter referred to as a TR switch, to transmit and receive signals using the same antenna. Examples of such wireless communications include magnetic field based communication systems (also referred to herein as inductive communication systems) having a single inductive coil. In a transmit mode, the inductive coil is energized to transmit a signal through a resulting time-varying magnetic field. In a receive mode, the inductive coil induces a voltage when in the presence of a time-varying magnetic field that is representative of a signal contained in the field.

Preferably, the frequency of the time-varying magnetic field for a transmitted signal closely corresponds with the resonant frequency of the transmitting circuit. A strong signal is transmitted from the antenna by energizing the coil with a large current at the resonant frequency. The receiving circuit has a resonant frequency that corresponds to the frequency of the time-varying magnetic field that contains the signal to be received.

Unfortunately, the TR switch introduces a resonance frequency shift by switching the antenna between driving circuitry for a transmit mode and receiving circuitry for a receive mode. This shift is attributable to the input capacitance of a low noise amplifier (LNA), which is also referred to herein as a DC blocking capacitor to the LNA. The DC block capacitor forms part of the resonance frequency in the transmit mode and does not form part of the resonance frequency in the receive mode. Furthermore, in the transmit mode, the large current used to drive the coil shifts the value of the coil inductance in a manner that adds to the resonance frequency shift attributable to the DC blocking capacitor. The resonance frequency shift penalizes the range between the transmitter and receiver because of the reduced power transfer associated with the frequency mismatch between the transmitting and receiving devices.

There is a need in the art to provide improve wireless communication systems.

SUMMARY

The above-mentioned problems are addressed by the present subject matter and will be understood by reading and studying the following specification. Various aspects and embodiments of the present subject matter cancel or otherwise compensate for the frequency shift that occurs when the hearing aid switches between the transmit and receive modes. The frequency shift occurs because the LNA input capacitance, also referred to herein as a DC blocking capacitor, significantly contributes to the resonance frequency in the transmit mode and does not significantly contribute to the resonance frequency in the receive mode. One embodiment for canceling the resonance frequency involves adding a capacitor in parallel to the tuning capacitor in the receive mode. Another embodiment for canceling the resonance frequency involves adding a capacitance in series in the transmit mode. Another embodiment for canceling the resonance frequency involves using a center-tapped coil as the inductive coil of the antenna, where part of the windings are used in the transmit mode and all of the windings are used in the receive mode.

Various aspects of the present subject matter relate to a communication system. Various embodiments of the communication system include an antenna with a resonant circuit having an inductive coil connected to a tuning capacitor. The communication system includes means to selectively drive the resonant circuit during a transmit mode, and means to selectively receive an induced signal in the resonant circuit during a receive mode. The communication system further includes means to selectively include a frequency shift canceling component in the resonant circuit to provide a first resonance frequency in the resonant circuit in the transmit mode and a second resonance frequency in the resonant circuit in the receive mode such that the first resonance frequency and the second resonance frequency are approximately equal.

Various aspects of the present subject relate to a hearing aid. Various embodiments of the hearing aid include a hearing aid receiver to present sound to an ear, a microphone system to receive acoustic signals, and an antenna element to transmit and receive inductive signals. The antenna element includes a first terminal, a second terminal and a node, and further includes a resonant circuit. The resonant circuit includes an inductive coil connected between the first terminal and the node, and a tuning capacitor connected between the second terminal and the node. The hearing further includes a DC blocking capacitor connected to the node of the antenna element, a frequency shift canceling component, and signal processing circuitry. The signal processing circuitry is connected to the microphone system to process received acoustic signals and present the processed signals to the hearing aid receiver, and is connected to the antenna element to process the received inductive signals. The signal processing circuitry includes a transmit-receive (TR) switch that responds to a control signal to include the frequency shift canceling component in the resonant circuit when switching to a first one of the transmit and receive modes, and to exclude the frequency shift canceling component in the resonant circuit when switching to a second one of the transmit and receive modes.

Various aspects relate to a method for switching modes in a wireless communication system having a resonant circuit in an antenna element. According to various embodiments of the method, it is determined whether a trigger to switch modes has occurred. A frequency shift canceling component is selectively incorporated in the resonant circuit to compensate for a resonant frequency shift. In various embodiments, the frequency shift canceling component is incorporated in the resonant circuit to switch from a transmit mode to a receive mode. In various embodiments, the frequency shift canceling component is incorporated in the resonant circuit to switch from a receive mode to a transmit mode.

This Summary is an overview of some of the teachings of the present application and not intended to be an exclusive or exhaustive treatment of the present subject matter. Further details about the present subject matter are found in the detailed description and appended claims. Other aspects will be apparent to persons skilled in the art upon reading and understanding the following detailed description and viewing the drawings that form a part thereof, each of which are not to

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. The following detailed description is, therefore, not to be taken in a limiting sense, and the scope of the present subject matter is defined only by the appended claims, along with the full scope of legal equivalents to which such claims are entitled.

Figure 1:
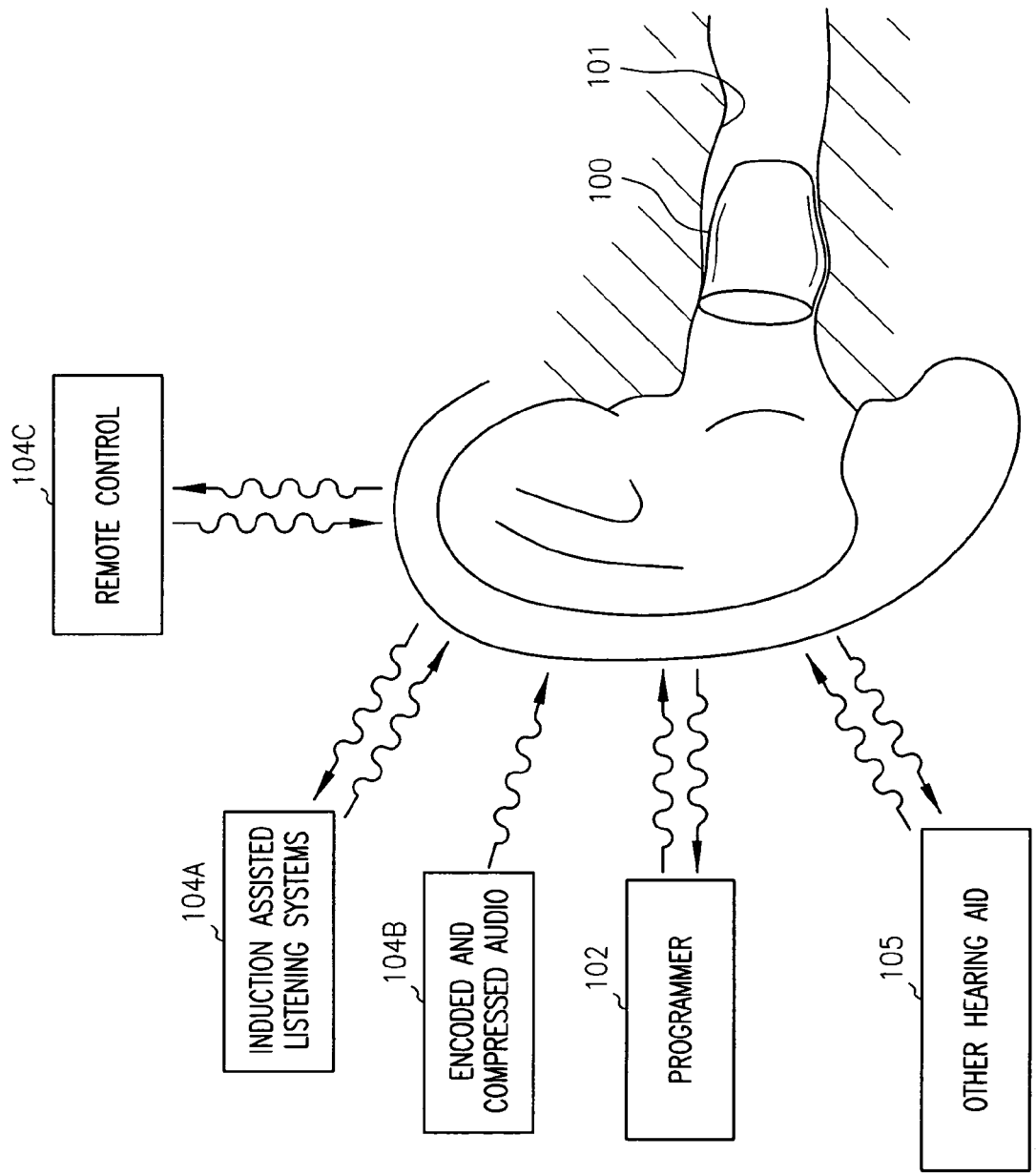
FIG. 1 illustrates a hearing aid device, according to various embodiments of the present subject matter.

FIG. 1 illustrates a hearing aid device, according to various embodiments of the present subject matter. The illustrated hearing aid device 100 is an in-the-ear hearing aid that is positioned completely in the ear canal 101. The present subject matter is not so limited, however. In addition to the illustrated in-the-ear style, the features of the present subject matter can be used in other styles of hearing assistance devices, including half-shell, in-the-canal, behind-the-ear, over-the-ear, eyeglass mount, implants, and body worn hearing aids, and further can be used in noise-protection earphones, headphones, and the like. Hearing aids, as used herein, refer to any device that aids a person's hearings, for example, devices that amplify sound, devices that attenuate sound, and devices that deliver sound to a specific person such as headsets for portable music players or radios.

Furthermore, the present subject matter provides advantages for other wireless communications systems that use a single antenna element and a TR switch to configure the antenna to transmit a signal or receive a signal without requiring additional, relatively large and costly electronic components such as capacitors. Thus, the present subject matter is useful in efforts to further miniaturize and reduce costs of wireless communications systems.

Referring again to FIG. 1, a wireless communication system in the hearing aid 100 is adapted to communicate with one or more devices. In various embodiments, the hearing aid 100 uses a magnetic field based wireless communication system to communicate with an external programmer 102. The programmer is able to adjust the hearing aid settings such as mode, volume and the like, to download a complete hearing aid program, and to receive data from the hearing aid for diagnostics, reporting and the like.

According to various embodiments, the wireless communication system is based on a magnetic principle that uses a carrier frequency and amplitude modulation. Various embodiments implement a carrier frequency of approximately 4 MHz. However, other frequencies can be used as the carrier frequency. Various embodiments modulate using on/off keying, where the carrier is ON for a digital "1" and is OFF for a digital "0." In on/off keying, ON corresponds to approximately 100% of the amplitude and OFF corresponds to approximately 0% of the amplitude. In one example of another amplitude modulation technique, a digital "1" corresponds to 100% of the amplitude and a digital "0" corresponds to 50% of the amplitude. Other amplitude modulation techniques can be used to transmit the digital data, and thus are within the scope of the present subject matter. Thus, embodiments of the wireless communication system include a digital system which converts an analog signal to a digital signal. The system has a limited bandwidth. Thus, the digital system further encodes and compresses the digital signal for transmission.

In various embodiments, the hearing aid 100 uses a magnetic field based wireless communication system to communicate with an induction assisted listening system 104A. In various embodiments, the hearing aid 100 uses a magnetic field based wireless communication system to communicate with a device that provides encoded and compressed audio 104B. In various embodiments, the hearing aid 100 uses a magnetic field based wireless communication system to communicate with a remote control device 104C. In various embodiments, the hearing aid 100 uses a magnetic field based wireless communication system to communicate with another hearing aid 105.

Figure 2:
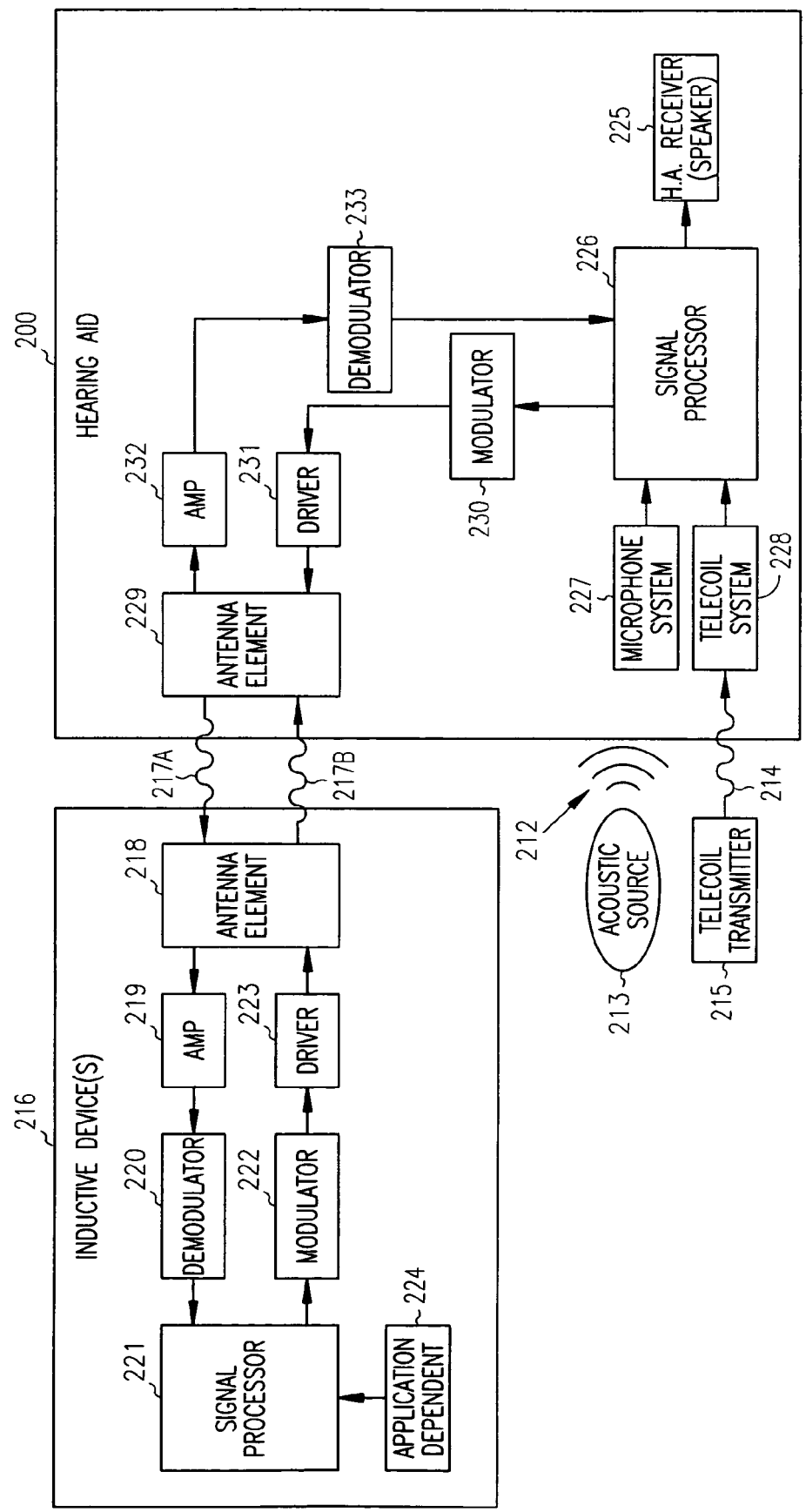
FIG. 2 illustrates a hearing aid device, according to various embodiments of the present subject matter.

FIG. 2 illustrates a hearing aid, according to various embodiments of the present subject matter. A wearer is capable of wearing the hearing aid device 200 to aid hearing in an ear. In the illustrated embodiment, the hearing aid device 200 is adapted to receive acoustic signals 212 (such as speech or other sound) from an acoustic source 213, and further is adapted to receive a signal 214 from a telecoil transmitter 215. The acoustic source 213 is a source of sound, as normally perceived by an ear such as a person talking and the like. Examples of telecoil transmitters 215 include, but are not limited to, telephones and some types of programmers.

The environment of the illustrated system includes inductive device(s) 216. Examples of induction devices 216 include programmers for hearing aids, and other hearing aid devices. The present subject matter is not limited to any particular type of inductive device(s) 216. The hearing aid 200 and the inductive devices(s) 216 communicate with each other through a modulated magnetic field 217A and 217B. In general, the inductive device(s) 216 include an antenna element 218 for use to receive signal 217A and transmit signal 217B. The signal representative of the received signal 217A is amplified using an amplifier 219, is demodulated using a demodulator 220 and is provided to signal processor 221. The signal processor 226 provides various signal processing functions which, according to various embodiments, include noise reduction, amplification, frequency response, and/or tone control. A signal representative of a signal to be transmitted to the hearing aid 200 is transmitted from the signal processor 221, is modulated using a modulator 222, and is driven to the antennal element using a driver 223. The inductive device(s) further include application dependent circuitry 224.

In the illustrated embodiment, the hearing aid device 200 includes a hearing aid receiver 225 (or speaker), a signal processor 226, a microphone system 227 for use to receive acoustic signals 212, a telecoil system 228 for use to receive signal 214 from a telecoil transmitter 215, and an antenna element 234 for use to transmit and receive inductive signals 217A and 217B. The microphone system 227 is capable of detecting the acoustic signal 212 and providing a representative signal to the signal processing circuit 227. The telecoil system 228 is capable of receiving a signal 214 from the telecoil transmitter 215 and providing a representative signal to the signal processor 226. The hearing aid 200 in the illustrated embodiment further includes a modulator 230 and driver 231, which in conjunction with the antenna element 234, is used to transmit signal 217A (an amplitude modulated inductive signal at a carrier frequency to transmit digital data) from the hearing aid 200 to the inductive device(s) 216. The hearing aid 200 in the illustrated embodiment further includes an amplifier 232 and a demodulator 233, which in conjunction with the antenna element 234, is used to receive signal 217B (an amplitude modulated inductive signal at a carrier frequency to transmit digital data) and provide a representative signal to the signal processor 226.

The illustrated hearing aid is capable of performing a number of functions. Some of these functions are identified here as examples. These examples are not intended to be an exhaustive list of the functions of the hearing aid. The wearer of the illustrated hearing aid 200 is capable of programming the volume (the amplitude of signal to the receiver 225) while listening to a person talking and/or any other acoustic signal 212. Additionally, the hearing aid 200 is capable of receiving digital audio through signal 217B that can be heard by the wearer of the hearing aid 200 without the acoustic sound or that can be superimposed with representative acoustic signals such that both the acoustic sound and the digital audio are heard by the wearer of the hearing aid 200.

One of ordinary skill in the art will understand that the antenna element 217 is an RLC circuit that has a resonant frequency. RLC circuits include a resistive (R), an inductive (L) and a capacitive (C) component. Each of the components are capable of being formed from one or more discrete elements. For example, the resistive (R) component includes inherent resistance in the signal pathways and in the devices, the inductive (L) component includes the inductance associated with the inductive coil in the antenna element, and the capacitive component includes the capacitance associated with the tuning capacitor, the DC blocking capacitor in the receive mode, and various parasitic capacitances.

The present subject matter cancels the frequency shift that occurs when the hearing aid switches between transmit and receive modes. As will be shown with respect to FIGS. 3, 4, 5A, 5B, 6, 7A and 7B, the frequency shift occurs because an LNA input capacitance, also referred to herein as a DC blocking capacitor, significantly contributes to the resonance frequency in the transmit mode and does not significantly contribute to the resonance frequency in the receive mode One embodiment of the present subject matter compensates for the resonance frequency shift by adding capacitance in parallel to the tuning capacitor in the receive mode. Another embodiment of the present subject matter compensates for the resonance frequency shift by adding capacitance in series in the transmit mode. Another embodiment of the present subject matter compensates for the resonance frequency shift by using part of the windings of a center-tapped coil in the transmit mode and all of the windings of the center-tapped coil in the receive mode.

Figure 3:
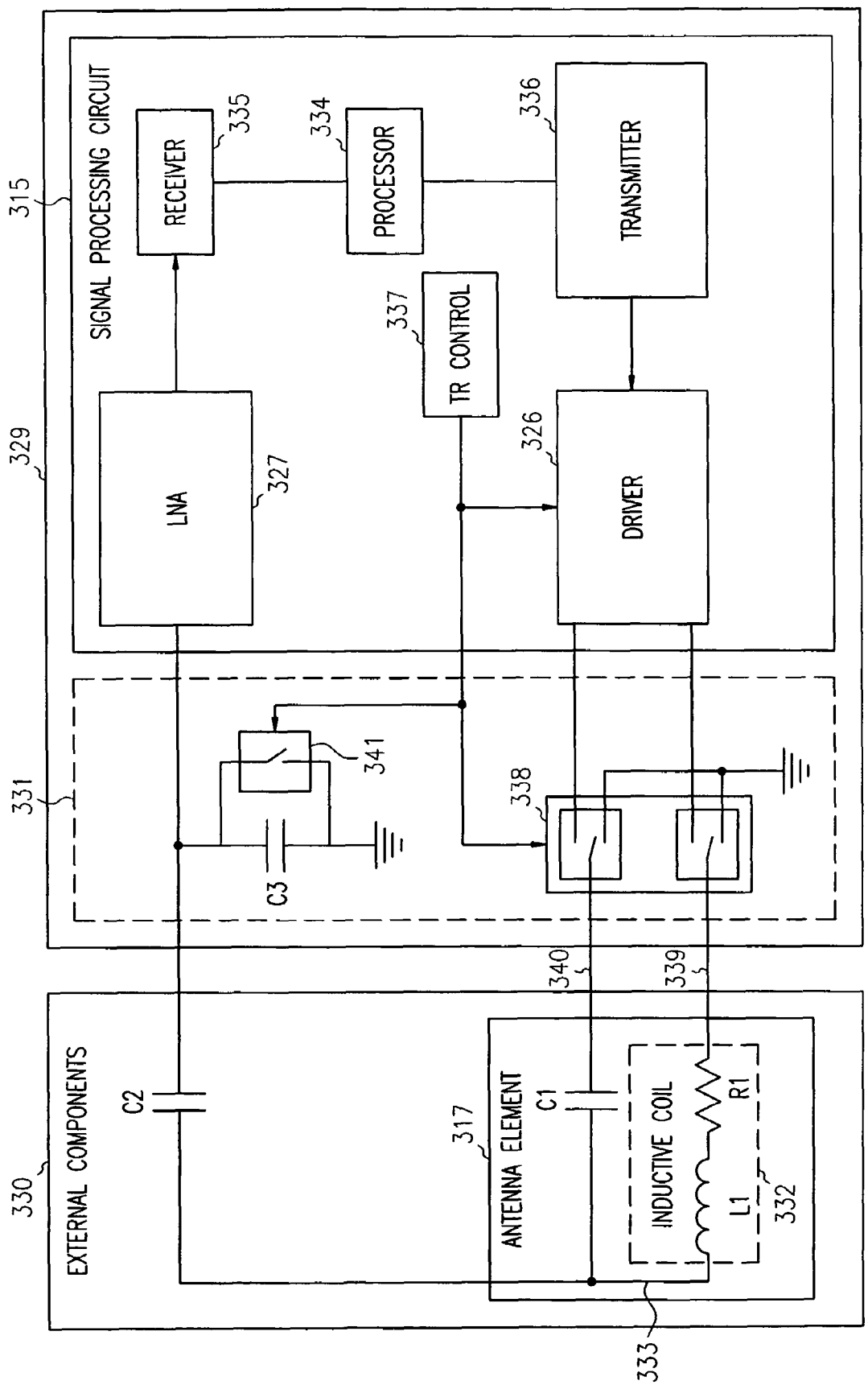
FIG. 3 illustrates portions of a hearing aid device, including a TR switch for an antenna element, according to various embodiments of the present subject matter.

FIG. 3 illustrates portions of a hearing aid device, including a TR switch for an antenna element, according to various embodiments of the present subject matter. The illustration includes representations for an integrated circuit (IC) portion 329 and for external components 315 with respect to the IC portion. The IC portion 329 includes the signal processing circuit 315 and a TR switch 331.

The external components 315 include the antenna element 317. The antenna element includes an inductive coil 332, represented by an inductor L1 in series with a resistance R1 associated with the resistance in the coil. The resistance R1 can also represent other resistances, such as the resistance in the lines or current limiting resistors. The antenna element 317 also includes a tuning capacitor C1 connected to the inductive coil at a node 333, also referred to as a center point, center node or signal pickup node. When the antenna element 317 receives a signal from an inductive source, a voltage is induced at the node 333. This voltage is presented to a low noise amplifier 354 in the IC 329 through a DC blocking capacitor C2. The voltage of a received signal applied to the input of the amplifier 354 is in the microvolt to minivolt range, and thus will not damage the IC 329. However, the voltage at the node 333 is several time higher than a maximum IC voltage rating (depending on the Q-factor) when a current is driven through the inductive coil 332 to transmit a signal from the antenna element 317. As is described in detail below, aspects of the present subject matter provides means to protect the IC from this high voltage.

The illustrated IC 329 includes a low noise amplifier 354 to receive an induced signal from the antenna element 317, and a driver 352 to drive a current through the inductive coil 332 of the antenna element 317 and transmit an inductive signal from the antenna element. The illustrated IC signal processing circuit 315 further includes a processor 334 in communication with a receiver 335 to process received signals from the amplifier 354, and in communication with a transmitter 336 to present a signal to the driver 352 that is to be driven through the inductive coil 332 of the antenna element 317. The illustrated signal processing circuit includes a TR control 337 to enable the driver, and to appropriately actuate the TR switch 331 to either transmit signals to the antenna element 333 in a transmit mode or receive signals from the antenna element 333 in a receive mode.

The illustrated TR switch functions to configure the antenna element 317 in series in the transmit mode and in parallel in the receive mode, and further functions to protect the IC from the large voltages generated at the node 333 during the transmit mode by shunting a capacitance C3 associated with the IC. A first portion 338 of the TR switch 331 is responsive to the TR control signal to operatively connect the driver 352 to the antenna element 317 during the transmit mode, and connect a first terminal 339 of the antenna element to a second terminal 340 of the antenna element to place the tuning capacitor C1 in parallel with the inductive coil 332 during the receive mode. In various embodiments, the first and second terminals 339 and 340 of the antenna element are connected to ground during the receive mode. A second portion 341 of the TR switch 331 is responsive to the TR control signal to form a shunt across the IC capacitance C3 to protect the IC during the transmit mode. One of ordinary skill in the art will understand, upon reading and comprehending the disclosure below, that additional portions of the TR switch are used to selectively include or exclude a frequency canceling component, according to various embodiments of the present subject matter.

Figure 4:
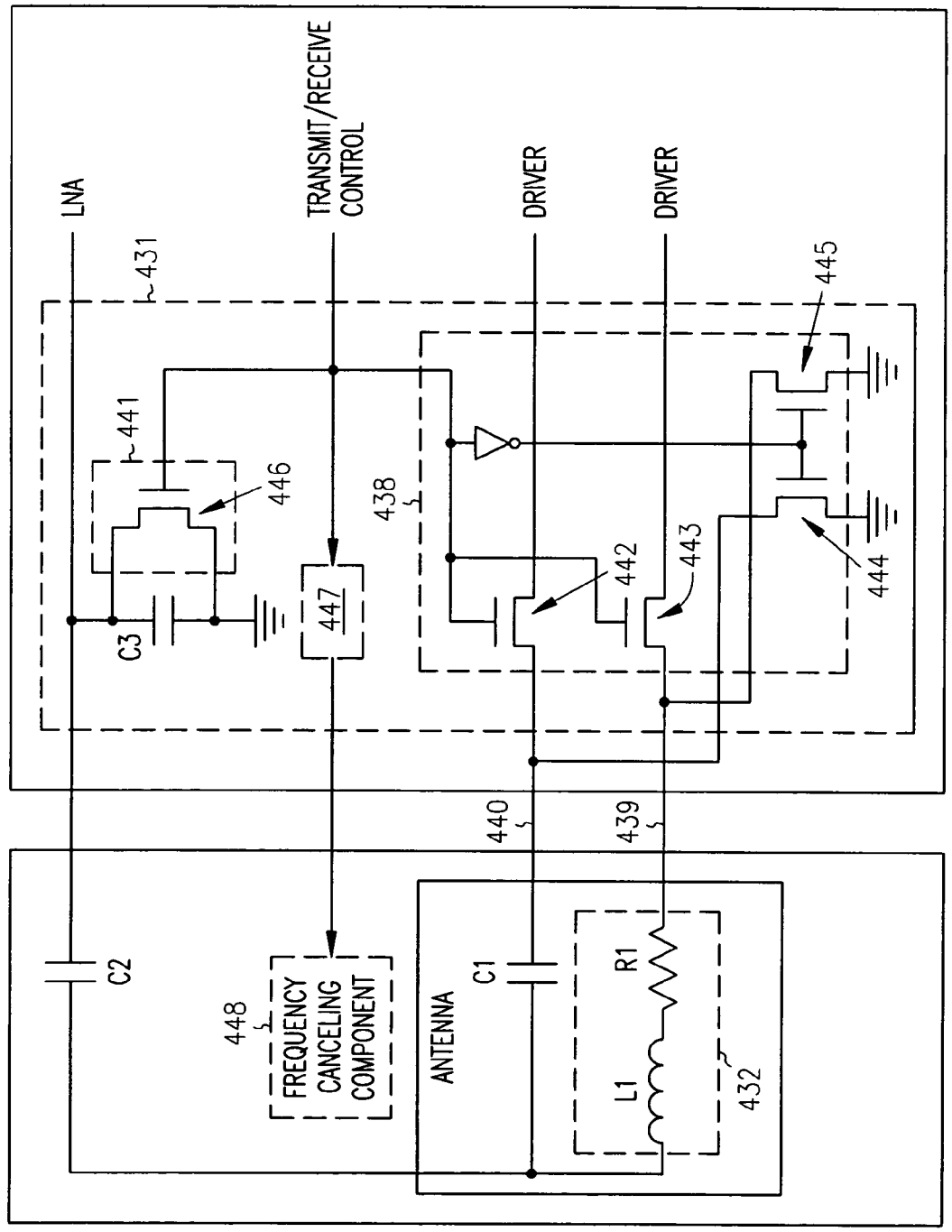
FIG. 4 illustrates the TR switch and the antenna element of FIG. 3, according to various embodiments of the present subject matter.

FIG. 4 illustrates the TR switch and the antenna element of FIG. 3, according to various embodiments of the present subject matter. In various embodiments, the first portion 438 of the TR switch 431 includes a first and second pass transistors 442 and 443 to selectively connect the driver to the antenna element during the transmit mode, and further includes a first and second pull-down transistors 444 and 445 to selectively ground the first and second terminals 439 and 440 of the antenna element during the receive mode. The gates of the first and second pass transistors and the first and second pull-down transistors are appropriately connected to the TR control signal to perform the desired function. The illustrated first portion of the TR switch is an embodiment, and is not intended to be the only design for a TR switch. Those of ordinary skill in the art will appreciate, upon reading and comprehending this disclosure, that there are other circuits that can be designed to perform the function of the first portion of the TR switch. Other circuits are capable of selectively connecting the driver to the antenna so that the components of the antenna are in series, and are capable of selectively disconnecting the driver from the antenna and connecting the tuning capacitor C1 in parallel across the inductive coil 432. In various embodiments, the second portion 441 of the TR switch 431 includes a bypass transistor 446 connected across the IC capacitance C3. The gate of the bypass transistor is appropriately connected to the TR control to perform the desired function. In various embodiments, the TR switch 431 includes a third portion 447 used to selectively include or exclude a frequency canceling component 448, according to various embodiments of the present subject matter. The third portion of the TR switch 431 and the frequency canceling component 448 are generally illustrates. Various embodiments of the frequency canceling component 448 include an external or non-IC components and various embodiments of the frequency canceling component 448 include an IC component.

The basic resonant circuit with the TR switch has a problem with resonant frequency shift when the mode changes from transmit to receive or from receive to transmit. There are two contributors to this shift, and both contributing factors add rather than cancel each other. The first contributing factor involves the changing inductance of the coil caused by the change in magnetic permeability of the ferrite core as the current drive level changes between transmit and receive mode. It is noted that this contributing factor is not an issue for air coils because the magnetic permeability is constant for air and is independent of the drive level. The second contributing factor is the DC bypass capacitor C2, which is part of the resonance circuit in the transmit mode. However, the DC bypass capacitor C2 is almost eliminated in the receive mode by the parasitic capacitance C3, which is much smaller than C2 and C1.

Figure 5A:
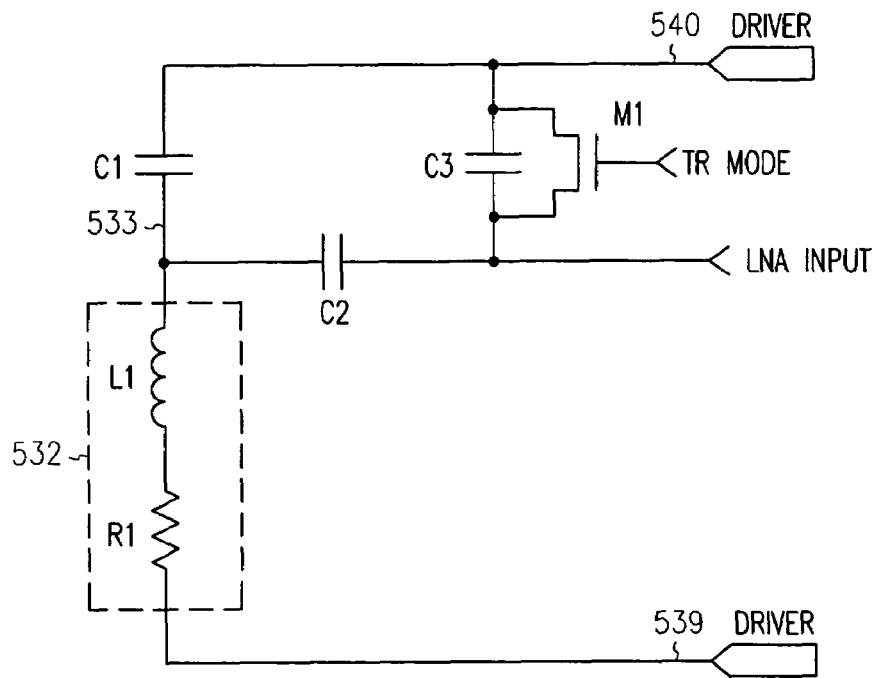
FIGS. 5A and 5B are schematic illustrations of the antenna element and a portion of the TR switch of FIG. 4.
Figure 5B:
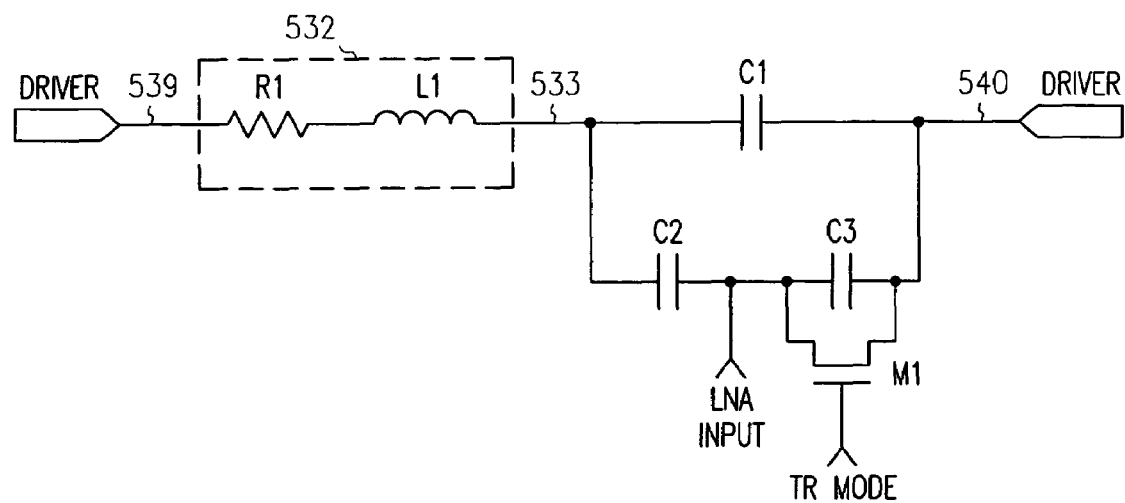

FIGS. 5A and 5B are schematic illustrations of the antenna element and a portion of the TR switch of FIG. 4. These illustrations doe not include a frequency canceling component. The antenna element includes the inductive coil 532 (L1 and R1) and the tuning capacitor C1. A first terminal 539 of the antenna element is connected to the inductive coil, and a second terminal 540 of the antenna element is connected to the tuning capacitor C1. The tuning capacitor C1 is connected to the inductive coil at a node 533 of the antenna element. The node 533 is connected to an input (LNA INPUT) of the low noise amplifier via the DC blocking capacitor C2. The input of the amplifier is associated with an IC capacitance C3. A bypass transistor M1, illustrated in FIG. 4 as 441, is connected across the IC capacitance, and is responsive to a TR control signal to selectively pull the amplifier input to ground to protect the IC from the high voltages generated at the node of the antenna element when a current is driven through the inductive coil. The schematic illustrated in FIG. 5B rearranges the components of the schematic in FIG. 5A to provide a schematic layout similar to the layout used in FIGS. 6, 7A and 7B to analyze the circuit.

Figure 6:
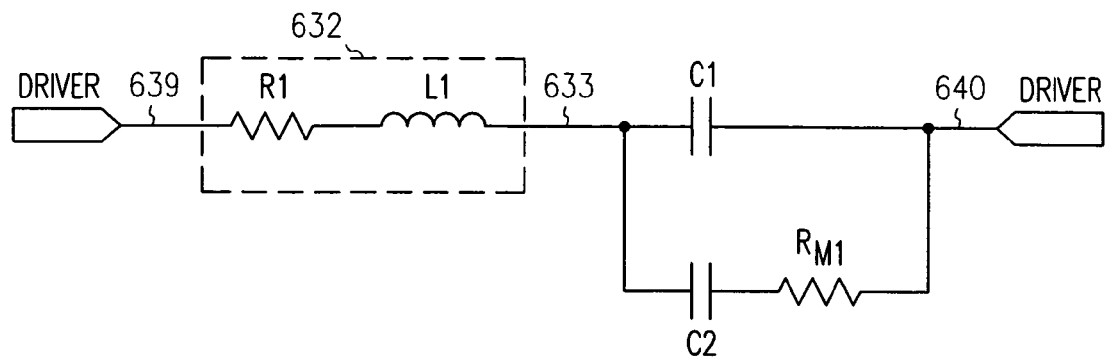
FIG. 6 illustrates a simplified circuit schematic for the antenna element of FIGS. 5A and 5B during a transmit mode.

FIG. 6 illustrates a simplified circuit schematic for the antenna element of FIGS. 5A and 5B during a transmit mode. Terminals 639 and 640, coil 632 and node 633 generally correspond to terminals 539 and 540, coil 532 and node 533 in FIG. 5, and to terminals 339 and 340, coil 332 and node 333 in FIG. 3. During the transmit mode, transistor M1 is actuated to provide a shunt across the IC capacitance C3. The illustrated resistance $R_{M1}$ represents the on-resistance of transistor M1. The value of $R_{M1}$ is relatively small, and thus can be ignored for the purposes of this discussion. The tuning capacitor C1 and the DC bypass capacitor C2 are effectively connected in parallel such that the equivalent capacitance of C1 and C2 is C1+C2. Thus, in the transmit mode, the resonance frequency for the antenna element of FIG. 5 is provided by Equation 1.

$$f_{Tx} = \frac{1}{2\pi\sqrt{L1 \times (C1 + C2)}} \quad TX \text{ MODE, NO CANCELING} \quad (1)$$

Figure 7A:
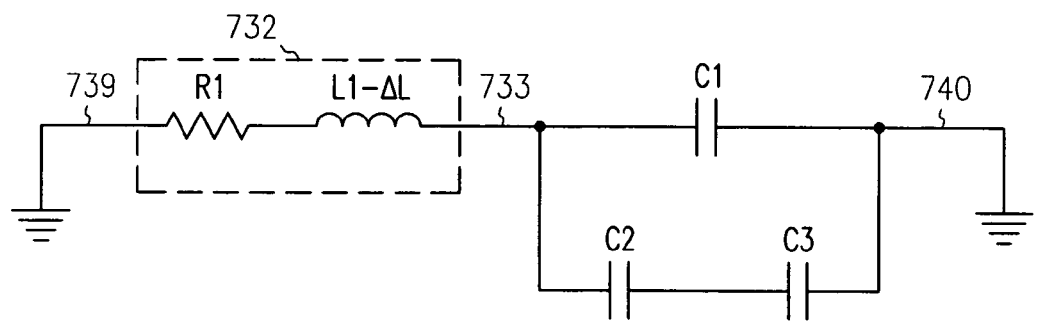
FIGS. 7A and 7B illustrate simplified circuit schematics for the antenna element of FIGS. 5A and 5B during a receive mode.
Figure 7B:
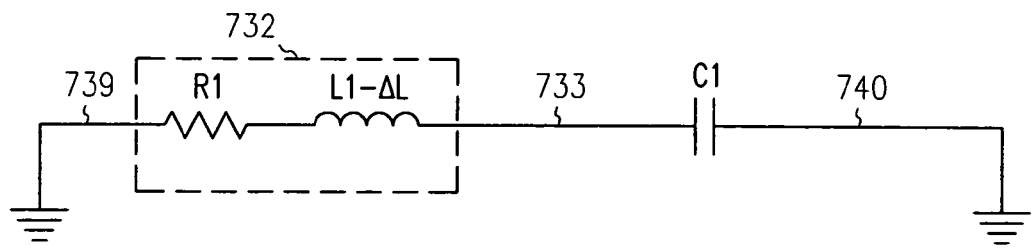

FIGS. 7A and 7B illustrate simplified circuit schematics for the antenna element of FIGS. 5A and 5B during a receive mode. Terminals 739 and 740, coil 732 and node 733 generally correspond to terminals 539 and 540, coil 532 and node 533 in FIG. 5, and to terminals 339 and 340, coil 332 and node 333 in FIG. 3. During the receive mode, transistor M1 is not actuated and the driver terminals are pulled to a reference potential (e.g. ground). As illustrated in FIG. 7A, the DC bypass capacitor C2 and the IC capacitance C3 are connected in series (represented as C2//C3, which corresponds to C2*C3/(C2+C3)). The IC capacitance C3 is much smaller than the DC bypass capacitance C2. Thus, the equivalent capacitance for C2 and C3 is sufficiently small such that they can be ignored for the purpose of this discussion. Therefore, in the receive mode, the antenna circuit can be further simplified as shown in FIG. 7B. FIGS. 7A and 7B also indicate that, in the receive mode, the inductance of L1 has been reduced by ΔL due to the change in current through the coil L1, which changes the magnetic permeability of the ferrite core of the coil. One of ordinary skill in the art will understand, upon reading and comprehending this disclosure, that the magnetic permeability for an air coil is constant and independent of the current, and thus will not affected by inductance change ΔL.

In the receive mode, the resonance frequency for the antenna element of FIG. 5 is provided by Equation 2, where ΔL is the inductance change attributable to the absence of the drive current.

$$f_{Rx} = \frac{1}{2\pi\sqrt{(L1 - \Delta L) \times C1}} \quad \text{RX MODE, NO CANCELING} \quad (2)$$

It is clear from Equations 1 and 2 that both the capacitance and the inductance decrease in the receive mode, such that the resonant frequency in the receive mode is higher than the resonant frequency in the transmit mode. The present subject matter selectively incorporates a frequency shift canceling component to compensate for the change in resonant frequency when switching from the transmit mode to the receive mode, and from the receive mode to the transmit mode.

The present subject matter cancels out the frequency shift that occurs when the hearing aid toggles between the transmit and receive modes. FIGS. 8A, 8B, 9A, 9B, 10A and 10B, described below, illustrate the circuit of FIGS. 5A and 5B where a capacitance is selectively added in parallel with respect to the tuning capacitor. FIGS. 11, 12A, 12B, 13A and 13B, described below, illustrate the circuit of FIGS. 5A and 5B where a capacitance is selectively added in series with respect to the tuning capacitor. FIGS. 14, 15A, 15B, 16A and 16B, described below, illustrate the circuit of FIG. 5 where a center-tapped coil is used as the inductive coil in the antenna, and the circuit is configured to selectively increase inductance in the receive mode and decrease inductance in the transmit mode.

Parallel Capacitor Embodiment

Figure 8A:
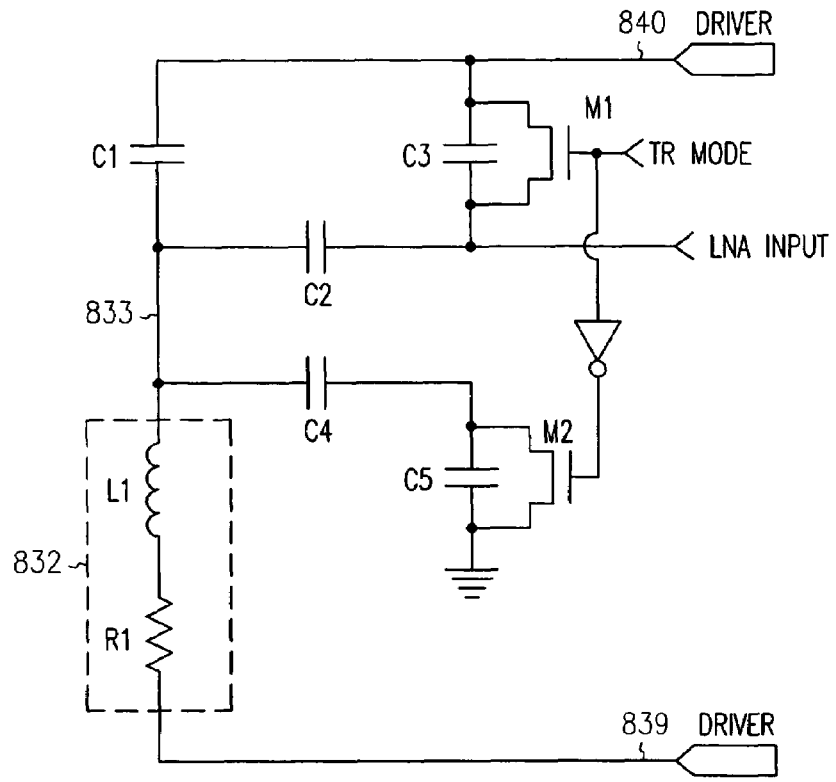
FIGS. 8A and 8B are schematic illustrations of the antenna element and a portion of the TR switch, according to a parallel capacitance embodiment of the present subject matter.
Figure 8B:
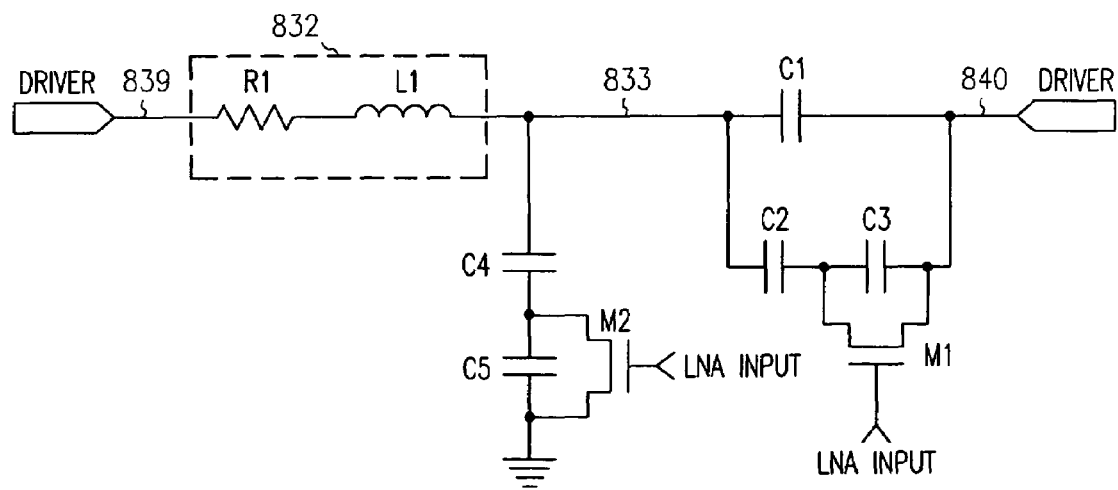

FIGS. 8A and 8B are schematic illustrations of the antenna element and a portion of the TR switch, according to a parallel capacitance embodiment of the present subject matter. The illustrated circuit is similar to the circuit illustrated in FIGS. 5A and 5B, and further includes frequency shift canceling components. These components include capacitor C4 and transistor M2. Terminals 839 and 840, coil 832 and node 833 generally correspond to terminals 539 and 540, coil 532 and node 533 in FIG. 5, and to terminals 339 and 340, coil 332 and node 333 in FIG. 3.

Capacitor C4 and transistor M2 are connected in series from the node 833 of the antenna element to the reference potential (e.g. ground). One of ordinary skill in the art will understand, upon reading and comprehending this disclosure, that the capacitor C4 and transistor M1 are effectively connected in parallel across the tuning capacitor C1 during the receive mode when the driver terminals are pulled to a reference potential (e.g. ground). Transistor M2 has a parasitic capacitance, illustrated as capacitor C5. Transistor M2 functions as a switch under control of the TR Mode signal. Thus, transistor M2 can be considered to be the third portion 447 of the TR switch 431 and capacitor C4 can be considered to be the frequency canceling component 448 illustrated in FIG. 4. In the illustrated embodiment, transistor M1 is actuated during a transmit mode, and transistor M2 is actuated during a receive mode.

Figure 9A:
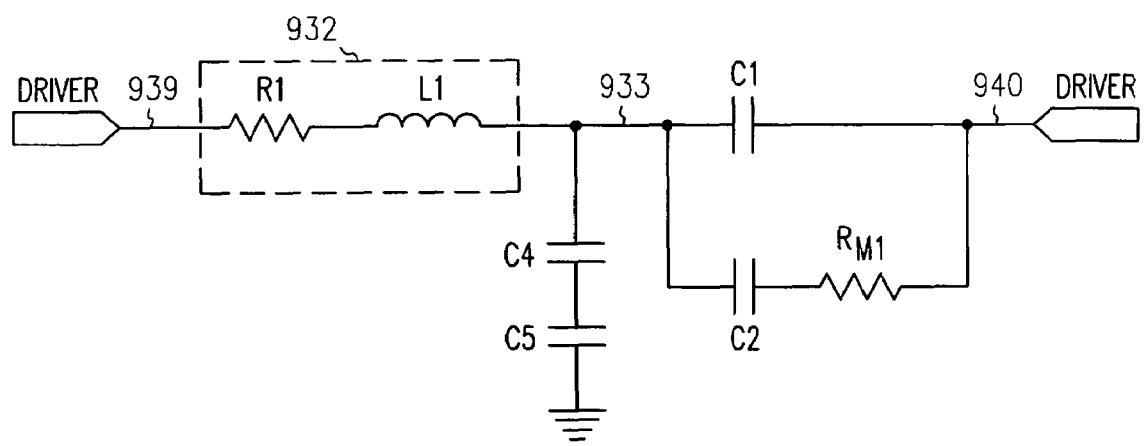
FIGS. 9A and 9B illustrate simplified circuit schematics for the antenna element of FIGS. 8A and 8B during a transmit mode, according to various embodiments of the present subject matter.
Figure 9B:
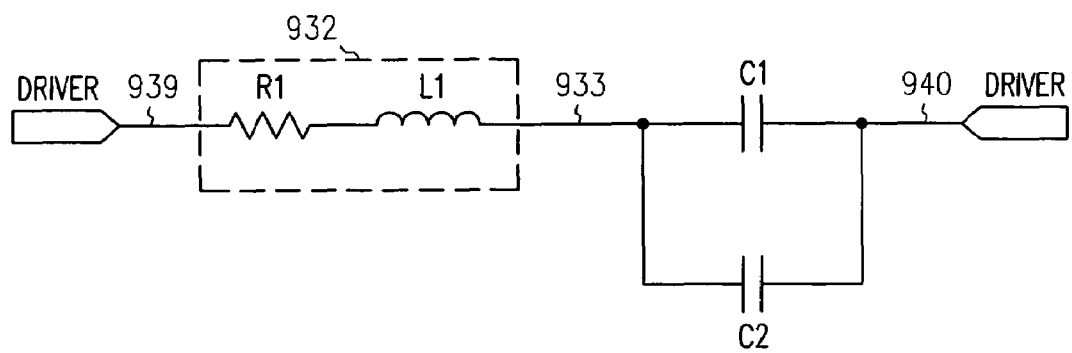

FIGS. 9A and 9B illustrate simplified circuit schematics for the antenna element of FIGS. 8A and 8B during a transmit mode, according to various embodiments of the present subject matter. Terminals 939 and 940, coil 932 and node 933 generally correspond to terminals 539 and 540, coil 532 and node 533 in FIG. 5, and to terminals 339 and 340, coil 332 and node 333 in FIG. 3. In the transmit mode, transistor M1 is actuated and transistor M2 is not actuated. FIG. 9A illustrates transistor M1 with resistance $R_{M1}$, which represents the on-resistance of transistor M1, and further illustrates transistor M2 with its parasitic capacitance C5. The parasitic capacitance C5 and capacitor C4 are connected in series (represented as C4//C5, which corresponds to C4*C5/(C4+C5)). The capacitance C4 is selected to be much larger than the parasitic capacitance C5. Thus, as indicated in the schematic of FIG. 9B, the equivalent capacitance for the combination of C4 and C5 is sufficiently small such that they can be ignored for the purpose of this discussion. Furthermore, the relatively small on-resistance of transistor M1 ($R_{M1}$) can also be ignored for the purpose of this discussion. FIG. 9B illustrates a simplified schematic of the antenna element of FIGS. 8A and 8B during the transmit mode.

From FIG. 9B, the resonance frequency in the transmit mode is represented by Equation 3.

$$f_{Tx} = \frac{1}{2\pi\sqrt{L1 \times (C1 + C2)}} \quad \text{TX MODE, PARALLEL} \quad (3)$$

Thus, as is evident from Equation 3, the tuning capacitor C1 and the DC bypass capacitor C2 are substantive elements for determining the resonance frequency in the transmit mode for the illustrated parallel capacitor embodiment.

Figure 10A:
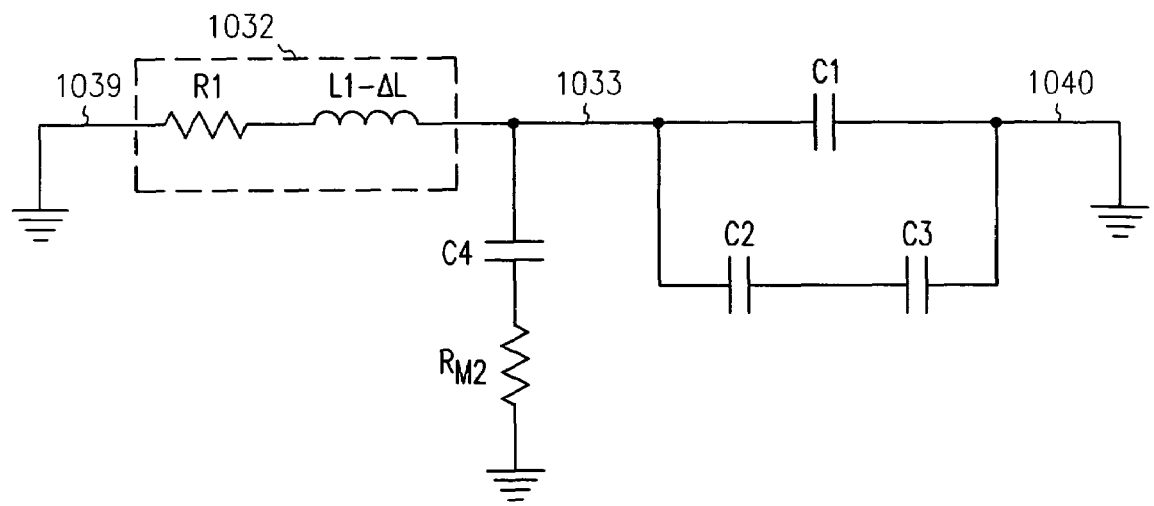
FIGS. 10A and 10B illustrate simplified circuit schematics for the antenna element of FIGS. 8A and 8B during a receive mode, according to various embodiments of the present subject matter.
Figure 10B:
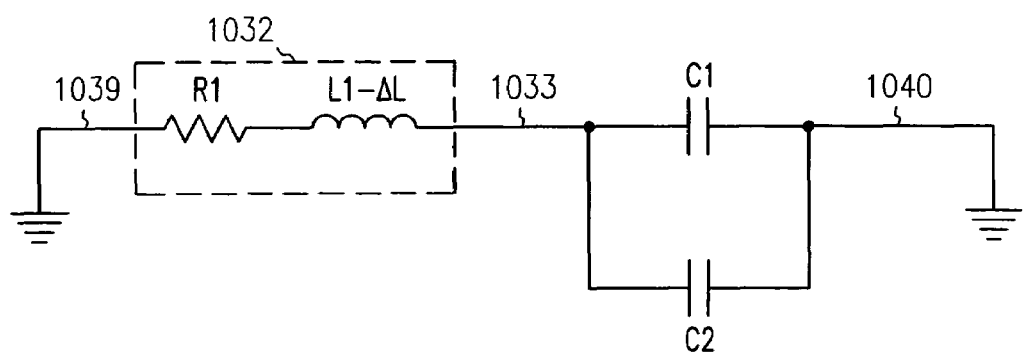

FIGS. 10A and 10B illustrate simplified circuit schematics for the antenna element of FIGS. 8A and 8B during a receive mode, according to various embodiments of the present subject matter. During the receive mode, transistor M1 is not actuated, transistor M2 is actuated, and the driver terminals are pulled to a reference potential (e.g. ground). FIG. 10A illustrates transistor M1 with its parasitic capacitance C3, which is also representative of the IC capacitance, and transistor M2 with its on-resistance $R_{M2}$. The IC capacitance C3 and the DC bypass capacitor C2 are connected in series (represented as C2//C3, which corresponds to C2*C3/(C2+C3)). The capacitance C2 is selected to be much larger than the parasitic capacitance C3. Thus, as indicated in the schematic of FIG. 10B, the equivalent capacitance for C2 and C3 is sufficiently small such that they can be ignored for the purpose of this discussion. Furthermore, the relatively small on-resistance of transistor M2 ($R_{M2}$) can also be ignored for the purpose of this discussion. FIG. 10B illustrates a simplified schematic of the antenna element of FIGS. 8A and 8B during the receive mode. In the receive mode, the inductance of L1 has been reduced by ΔL due to the change in current through the coil L1, which changes the magnetic permeability of the ferrite core of the coil.

From FIG. 10B, the resonance frequency in the receive mode is represented by Equation 4.

$$f_{Rx} = \frac{1}{2\pi\sqrt{(L1-\Delta L)\times(C1+C4)}} \quad \text{RX MODE, PARALLEL} \quad (4)$$

Thus, as is evident from Equation 4, the tuning capacitor C1 and the additional capacitor C4 are substantive elements for determining the resonance frequency in the receive mode for the illustrated parallel capacitor embodiment. C4 is selected to compensate for both missing capacitance attributed to the DC bypass capacitor C2 and the lower inductance ΔL attributable to the absence of the transmitting drive current. C4 is larger than C2 to cancel the frequency shift caused by C2 and L1. This solution eliminates the frequency shift with one additional capacitor.

Series Capacitor Embodiment

Figure 11:
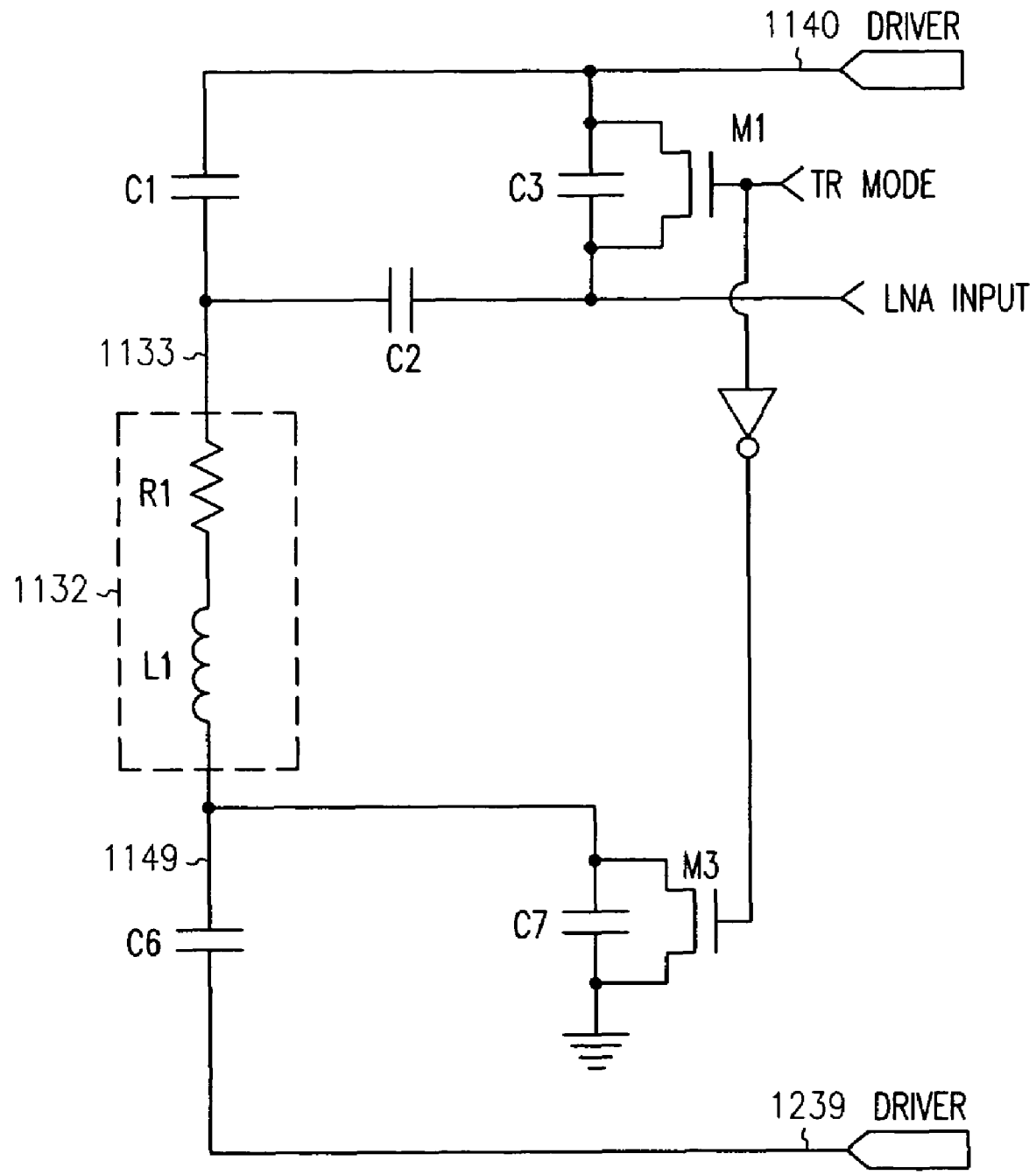
FIG. 11 is a schematic illustration of the antenna element and a portion of the TR switch, according to a series capacitance embodiment of the present subject matter.

FIG. 11 is a schematic illustration of the antenna element and a portion of the TR switch, according to a series capacitance embodiment of the present subject matter. The illustrated circuit is similar to the circuit illustrated in FIGS. 5A and 5B, and further includes frequency shift canceling components. These components include capacitor C6 and transistor M3. Terminals 1139 and 1140, coil 1132 and node 1133 generally correspond to terminals 539 and 540, coil 532 and node 533 in FIG. 5, and to terminals 339 and 340, coil 332 and node 333 in FIG. 3.

Capacitor C6 is connected in series with the coil and the tuning capacitor C1. Transistor M3 is connected to pull node 1149 to a reference potential (e.g. ground) during a receive mode. One of ordinary skill in the art will understand, upon reading and comprehending this disclosure, that the capacitor C6 is effectively connected in series with respect to the tuning capacitor C1 during the transmit mode. Transistor M3 has a parasitic capacitance, illustrated as capacitor C7. Transistor M3 functions as a switch under control of the TR Mode signal. Thus, transistor M3 can be considered to be the third portion 447 of the TR switch 431 and capacitor C6 can be considered to be the frequency canceling component 448 illustrated in FIG. 4. In the illustrated embodiment, transistor M1 is actuated during a transmit mode, and transistor M3 is actuated during a receive mode.

Figure 12A:
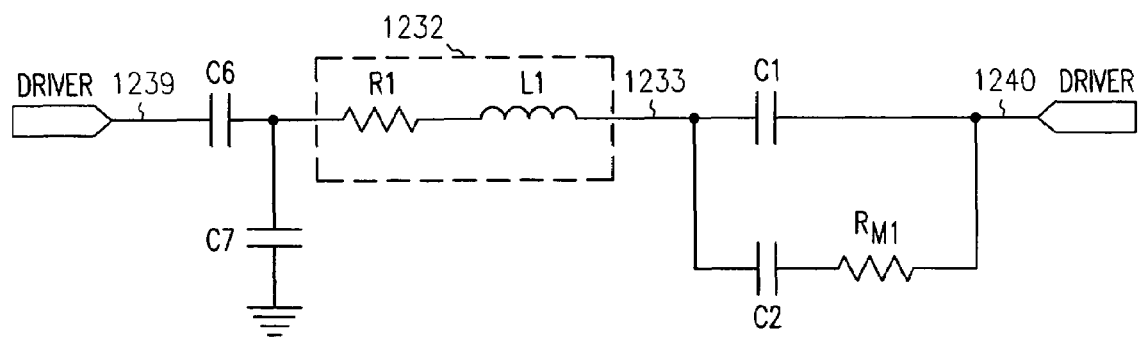
FIGS. 12A and 12B illustrate simplified circuit schematics for the antenna element of FIG. 11 during a transmit mode, according to various embodiments of the present subject matter.
Figure 12B:
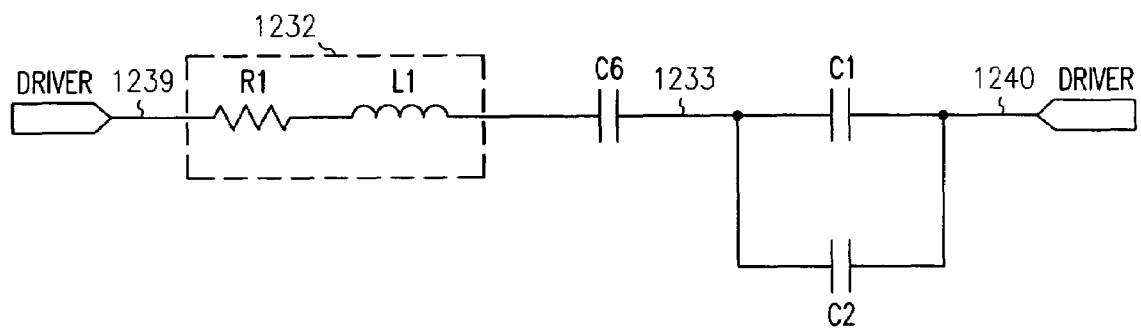

FIGS. 12A and 12B illustrate simplified circuit schematics for the antenna element of FIG. 11 during a transmit mode, according to various embodiments of the present subject matter. Terminals 1239 and 1240, coil 1232 and node 1233 generally correspond to terminals 539 and 540, coil 532 and node 533 in FIG. 5, and to terminals 339 and 340, coil 332 and node 333 in FIG. 3. In the transmit mode, transistor M1 is actuated and transistor M3 is not actuated. FIG. 12A illustrates transistor M1 with resistance $R_{M1}$, which represents the on-resistance of transistor M1, and further illustrates transistor M3 with its parasitic capacitance C7. The parasitic capacitance C7 is insignificant for the purposes of this discussion. Thus, as indicated in the schematic of FIG. 10B, the capacitor is illustrated in series with the parallel combination of tuning capacitor C1 and the DC bypass capacitor. Furthermore, the relatively small on-resistance of transistor M1 ($R_{M1}$) can also be ignored for the purpose of this discussion. FIG. 12B illustrates a simplified schematic of the antenna element of FIGS. 11A and 11B during the transmit mode.

From FIG. 12B, the resonance frequency in the transmit mode is represented by Equations 5 and 6.

$$f_{Tx} = \frac{1}{2\pi\sqrt{L1\times((C1+C2)//C6)}}; \text{ or} \quad (5)$$

$$f_{Tx} = \frac{1}{2\pi\sqrt{L1\times\frac{(C1+C2)\times C6}{C1+C2+C6}}} \quad \text{TX MODE, SERIES} \quad (6)$$

Thus, as is evident from Equations 5 and 6, the tuning capacitor C1, the DC bypass capacitor C2, and capacitor C6 are substantive elements for determining the resonance frequency in the transmit mode for the illustrated series capacitor embodiment.

Figure 13A:
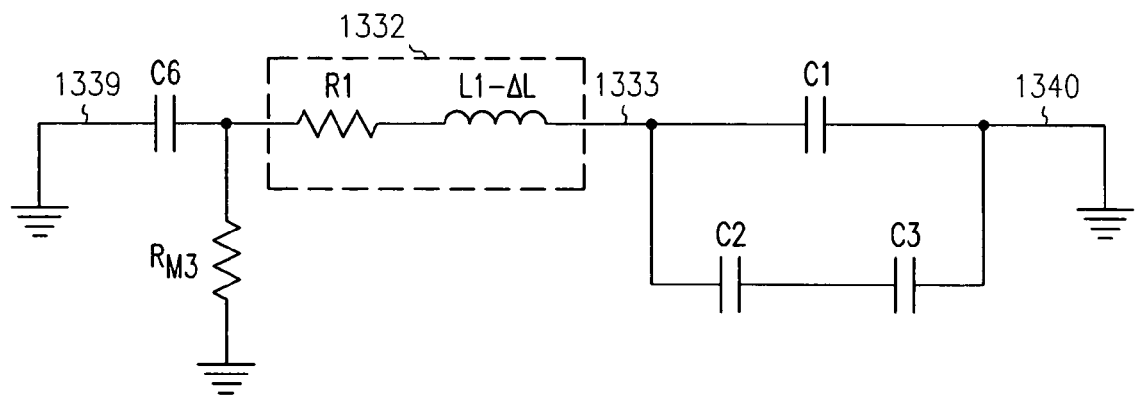
FIGS. 13A and 13B illustrate simplified circuit schematics for the antenna element of FIG. 11 during a receive mode, according to various embodiments of the present subject matter.
Figure 13B:
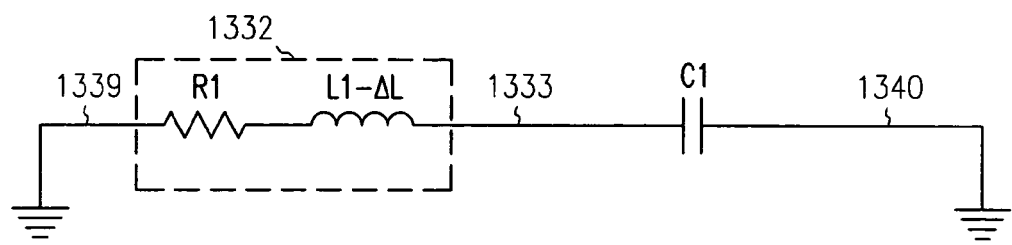

FIGS. 13A and 13B illustrate simplified circuit schematics for the antenna element of FIG. 11 during a receive mode, according to various embodiments of the present subject matter. Terminals 1339 and 1340, coil 1332 and node 1333 generally correspond to terminals 539 and 540, coil 532 and node 533 in FIG. 5, and to terminals 339 and 340, coil 332 and node 333 in FIG. 3. During the receive mode, transistor M1 is not actuated, transistor M3 is actuated, and the driver terminals are pulled to a reference potential (e.g. ground). FIG. 13A illustrates transistor M1 with its parasitic capacitance C3, which is also representative of the IC capacitance, and transistor M3 with its on-resistance $R_{M3}$. The IC capacitance C3 and the DC bypass capacitor C2 are connected in series (represented as C2//C3, which corresponds to C2*C3/(C2+C3)). The capacitance C2 is selected to be much larger than the parasitic capacitance C3. Thus, as indicated in the schematic of FIG. 13B, the equivalent capacitance for C2 and C3 is sufficiently small such that they can be ignored for the purpose of this discussion. The on-resistance of transistor M3 ($R_{M3}$) pulls a node of the coil to a reference potential (e.g. ground). The value of $R_{M3}$ is sufficiently small to be ignored for the purposes of this discussion. FIG. 13B illustrates a simplified schematic of the antenna element of FIG. 11 during the receive mode. In the receive mode, the inductance of L1 has been reduced by ΔL due to the change in current through the coil L1, which changes the magnetic permeability of the ferrite core of the coil.

From FIG. 13B, the resonance frequency in the receive mode is represented by Equation 7.

$$f_{Rx} = \frac{1}{2\pi\sqrt{(L1-\Delta L)\times C1}} \quad \text{RX MODE, SERIES} \quad (7)$$

Thus, as is evident from Equation 7, the tuning capacitor C1 is a substantive component for determining the resonance frequency in the receive mode for the illustrated series capacitor embodiment. C6 is selected to compensate for both missing capacitance attributed to the DC bypass capacitor C2 and the lower inductance ΔL attributable to the absence of the transmitting drive current. This solution eliminates the frequency shift with one additional capacitor.

Center-Tapped Coil Embodiment

Figure 14:
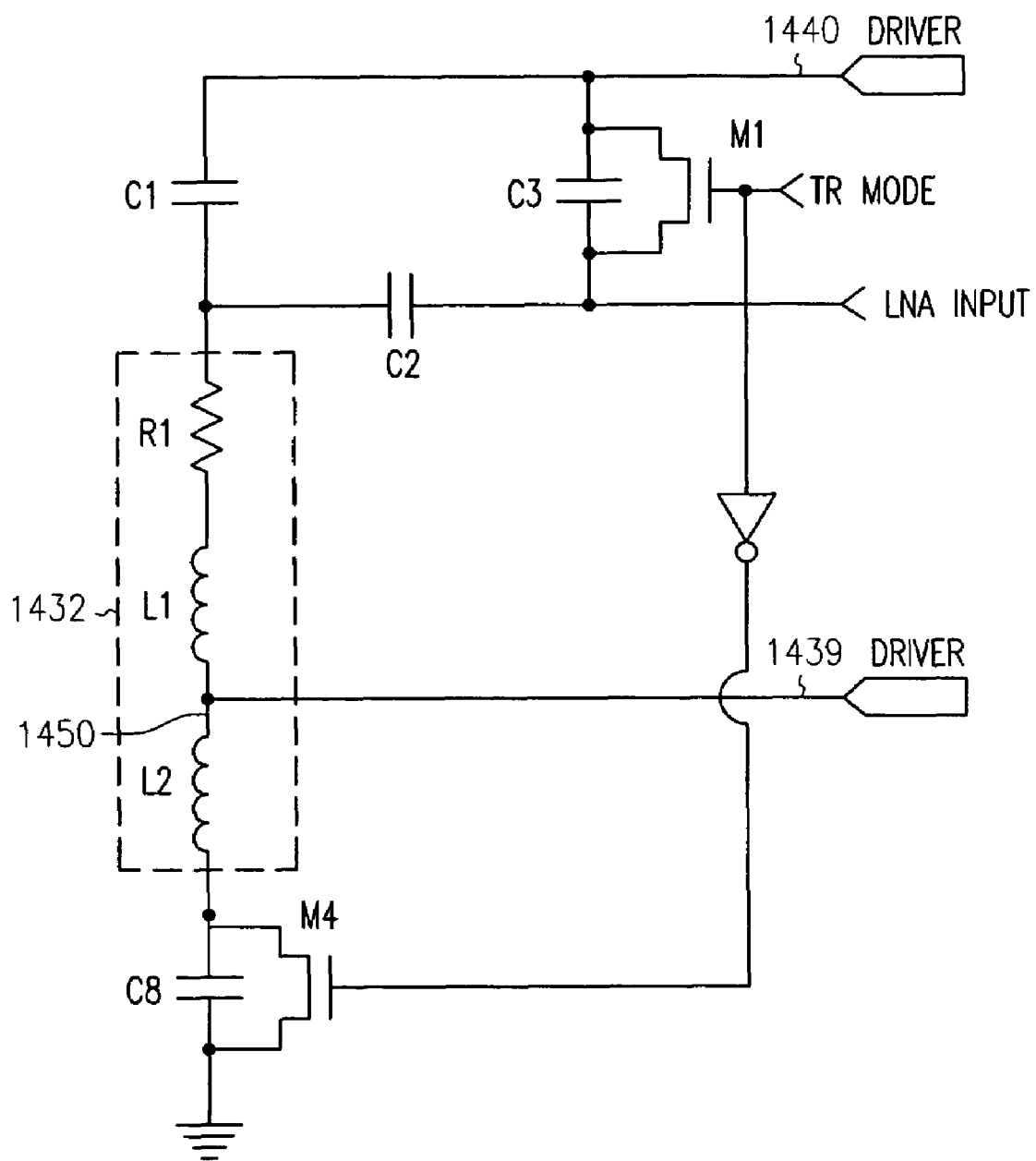
FIG. 14 is a schematic illustration of the antenna element and a portion of the TR switch, according to a center-tapped inductor embodiment of the present subject matter.

FIG. 14 is a schematic illustration of the antenna element and a portion of the TR switch, according to a center-tapped inductor embodiment of the present subject matter. The illustrated circuit is similar to the circuit illustrated in FIGS. 5A and 5B, and further includes frequency shift canceling components. These components include a center-tapped coil L1, L2 and a transistor M4. Terminals 1439 and 1440, coil 1432 and node 1433 generally correspond to terminals 539 and 540, coil 532 and node 533 in FIG. 5, and to terminals 339 and 340, coil 332 and node 333 in FIG. 3.

One of ordinary skill in the art will understand, upon reading and comprehending this disclosure, that two separate coils can be used to replace the center-tapped coil. Additionally, one of ordinary skill in the art will understand, upon reading and comprehending this disclosure, that first coil portion L1 and the second coil portion L2 of the coil need not have an equal number of turns or equal inductance. The term center-tapped coil is intended to include coils having a tap anywhere along its length to form the first coil portion L1 and the second coil portion L2. Various embodiments wind the first coil portion L1 and the second coil portion L2 on the same core. One of the driver terminals is connected to a node 1450 between the first coil portion L1 and the second coil portion L2.

Transistor M4 is configured to pull the second coil portion L2 to a reference potential (e.g. ground) during a receive mode. Transistor M4 has a parasitic capacitance, illustrated as capacitor C8. Transistor M4 functions as a switch under control of the TR Mode signal. Thus, transistor M4 can be considered to be the third portion 447 of the TR switch 431 and the second coil portion L2 can be considered to be the frequency canceling component 448 illustrated in FIG. 4. In the illustrated embodiment, transistor M1 is actuated during a transmit mode, and transistor M4 is actuated during a receive mode.

Figure 15A:
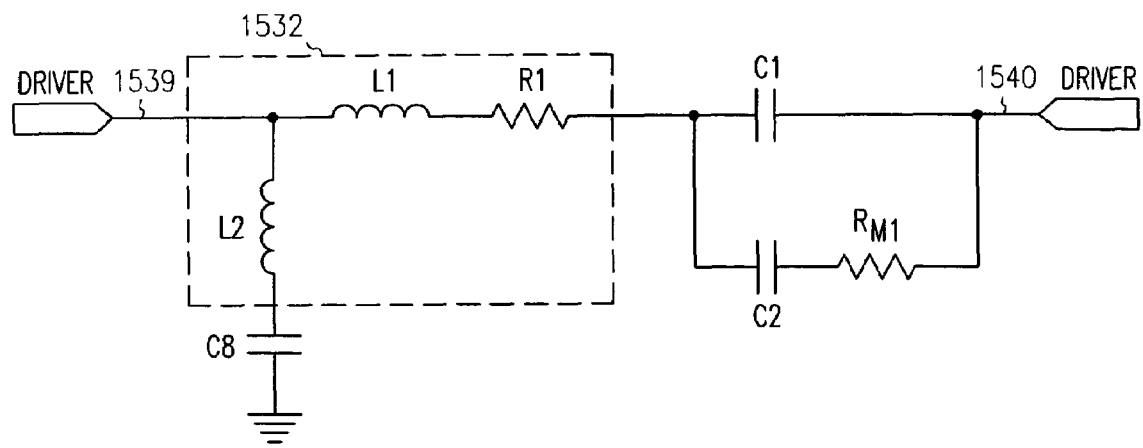
FIGS. 15A and 15B illustrate simplified circuit schematics for the antenna element of FIG. 14 during a transmit mode, according to various embodiments of the present subject matter.
Figure 15B:
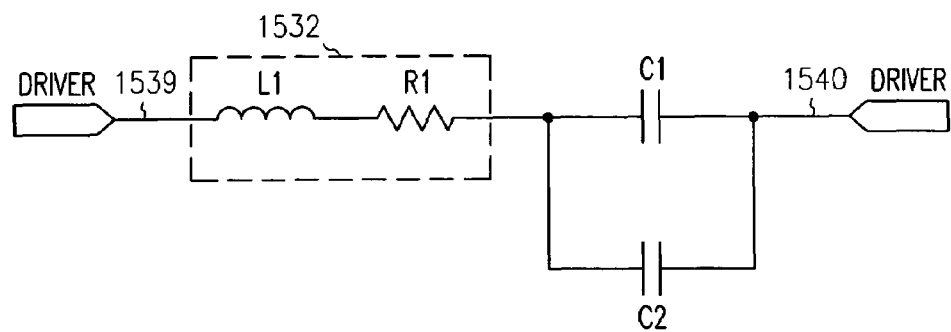

FIGS. 15A and 15B illustrate simplified circuit schematics for the antenna element of FIG. 14 during a transmit mode, according to various embodiments of the present subject matter. Terminals 1539 and 1540, coil 1532 and node 1533 generally correspond to terminals 539 and 540, coil 532 and node 533 in FIG. 5, and to terminals 339 and 340, coil 332 and node 333 in FIG. 3.

In the transmit mode, transistor M1 is actuated and transistor M4 is not actuated. FIG. 15A illustrates transistor M1 with resistance $R_{M1}$, which represents the on-resistance of transistor M1, and further illustrates transistor M4 with its parasitic capacitance C8. The relatively small on-resistance of transistor M1 ($R_{M1}$) can also be ignored for the purpose of this discussion. In the transmit mode, two LC circuits exist simultaneously. The main LC (L1 and C1+C2) and a parasitic LC (L2 and C which is the pad capacitance). The parasitic resonance frequency is more than a decade higher than the driver frequency in order to avoid magnetic field cancellation in the magnetic core. Also the voltage at the node between L2 and C8 is not higher than the drive voltage. FIG. 15B illustrates a simplified schematic of the antenna element of FIGS. 14A and 14B during the transmit mode.

From FIG. 15B, the resonance frequency in the transmit mode is represented by Equation 8.

$$f_{Tx} = \frac{1}{2\pi\sqrt{L1 \times (C1 + C2)}} \quad TX \text{ MODE, CENTER-TAPPED} \quad (8)$$

Thus, as is evident from Equation 8, the tuning capacitor C1, the DC bypass capacitor C2 and the first coil portion L1 are substantive components for determining the resonance frequency in the transmit mode for the illustrated center-tapped inductor embodiment.

Figure 16A:
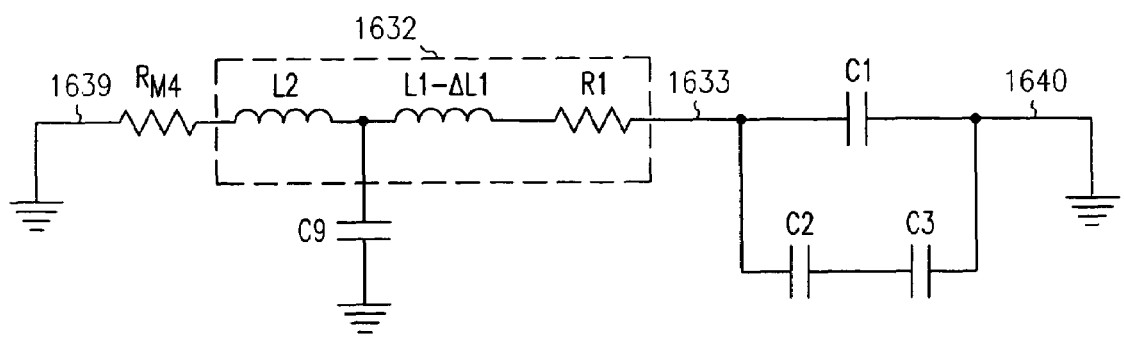
FIGS. 16A and 16B illustrate simplified circuit schematics for the antenna element of FIG. 14 during a transmit mode, according to various embodiments of the present subject matter.
Figure 16B:
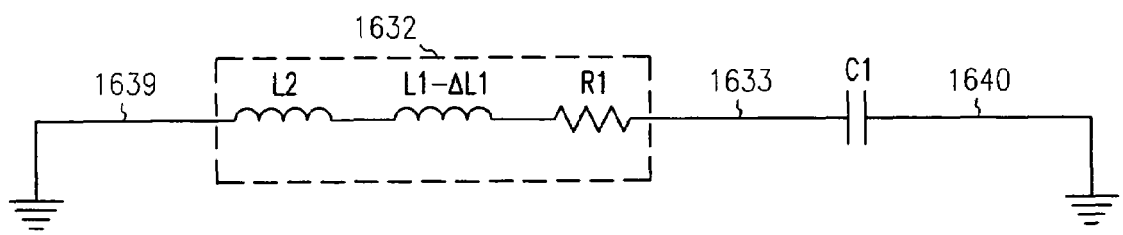

FIGS. 16A and 16B illustrate simplified circuit schematics for the antenna element of FIG. 14 during a receive mode, according to various embodiments of the present subject matter. Terminals 1639 and 1640, coil 1632 and node 1633 generally correspond to terminals 539 and 540, coil 532 and node 533 in FIG. 5, and to terminals 339 and 340, coil 332 and node 333 in FIG. 3.

In the transmit mode, transistor M1 is not actuated and transistor M4 is actuated. FIG. 16A illustrates transistor M4 with resistance $R_{M4}$, which represents the on-resistance of transistor M4, and further illustrates transistor M1 with its parasitic capacitance C8, which is also representative of the IC capacitance. The relatively small on-resistance of transistor M4 ($R_{M4}$) can also be ignored for the purpose of this discussion. In the receive mode, the driver between the first inductive portion L1 and the second inductive portion L2 goes into tri-state. The parasitic capacitance C9 should be so small that it have a negligible effect on the receive circuit.

From FIG. 16B, the resonance frequency in the receive mode is represented by Equation 9.

$$f_{Tx} = \frac{1}{2\pi\sqrt{(L1 - \Delta L + L2) \times C1}} \quad RX \text{ MODE, CENTER-TAPPED} \quad (9)$$

Thus, as is evident from Equation 9, the first and second inductive portions L1+L2 and the tuning capacitor C1 are substantive components for determining the resonance frequency in the receive mode. L2 is large enough to compensate for the L1 change and L2. This embodiment involves only a few additional turns on the existing magnetic core. It is also suitable for IC implementation with a minimal number of external parts. These external parts are L1, L2, R1, C1 and C2. Furthermore, the voltages at the IC pads will not be higher than the drive voltage and therefore, eliminating the risk of generating voltages higher than the maximum rated values.

Figure 17A:
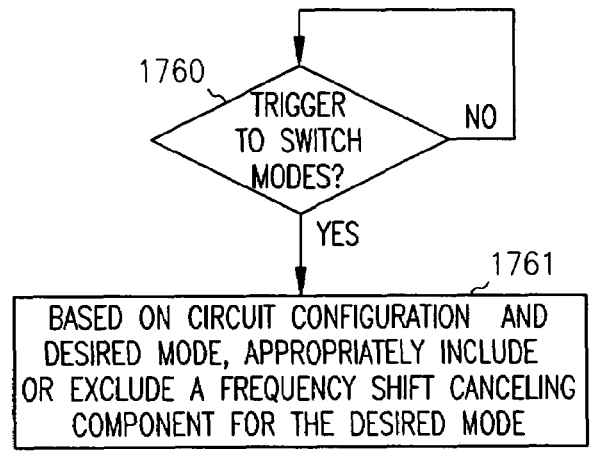
FIGS. 17A, 17B, 17C and 17D illustrate a process for switching communication modes in a wireless hearing aid, according to various embodiments of the present subject matter.

FIGS. 17A, 17B, 17C and 17D illustrate a process for switching communication modes in a wireless hearing aid, according to various embodiments of the present subject matter. Referring to FIG. 17A, a trigger signal is provided to switch modes, including to switch from a receive mode to a transmit mode, and to switch from a transmit mode to a receive mode. At 1760, it is determined whether a trigger to switch modes has occurred. When a trigger to switch modes occurs, the process proceeds to 1761, where a frequency shift canceling component is appropriately included or excluded for a desired mode based on a circuit configuration and the desired mode. The frequency shift canceling component, or components, are used to compensate for the changing inductance of the coil caused by the change in magnetic permeability of the ferrite core as the current drive level changes between transmit and receive mode, and the near elimination of the DC bypass capacitor C2 in the receive mode.

Figure 17B:
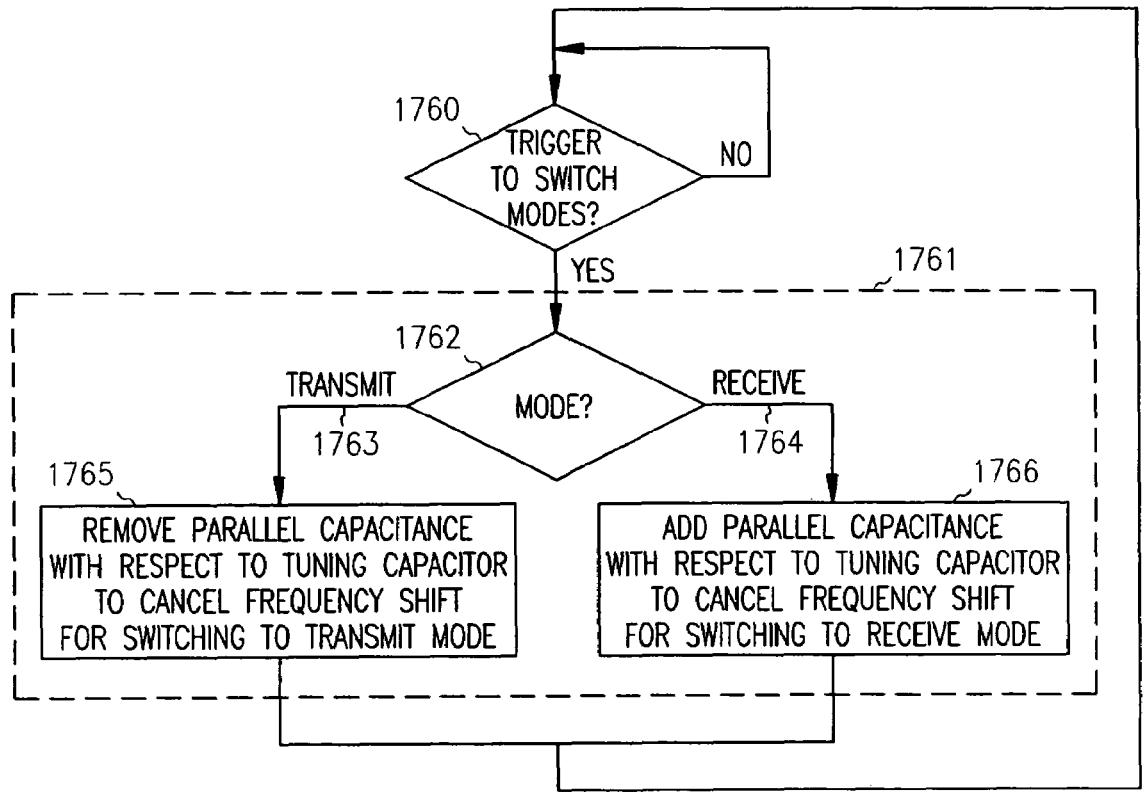

FIG. 17B illustrates a process for switching communication modes in a wireless hearing aid, according to a parallel capacitor embodiment of the present subject matter. In this embodiment, the frequency shift canceling component includes a parallel capacitance with respect to the tuning capacitor. At 1760, it is determined whether a trigger to switch modes has occurred. When a trigger to switch modes occurs, the process proceeds to 1762, where it is determined whether the mode is being switched to a transmit mode, represented at 1763, or to a receive mode, represented at 1764. When the mode is being switched to the transmit mode 1763, the process proceeds to 1765, where a parallel capacitance with respect to the tuning capacitor is removed to cancel the frequency shift associated with switching from the receive mode to the transmit mode. When the mode is being switched to the receive mode 1764, the process proceeds to 1766, where the parallel capacitance with respect to the tuning capacitor is added to cancel the frequency shift associated with switching from the transmit mode to the receive mode.

Figure 17C:
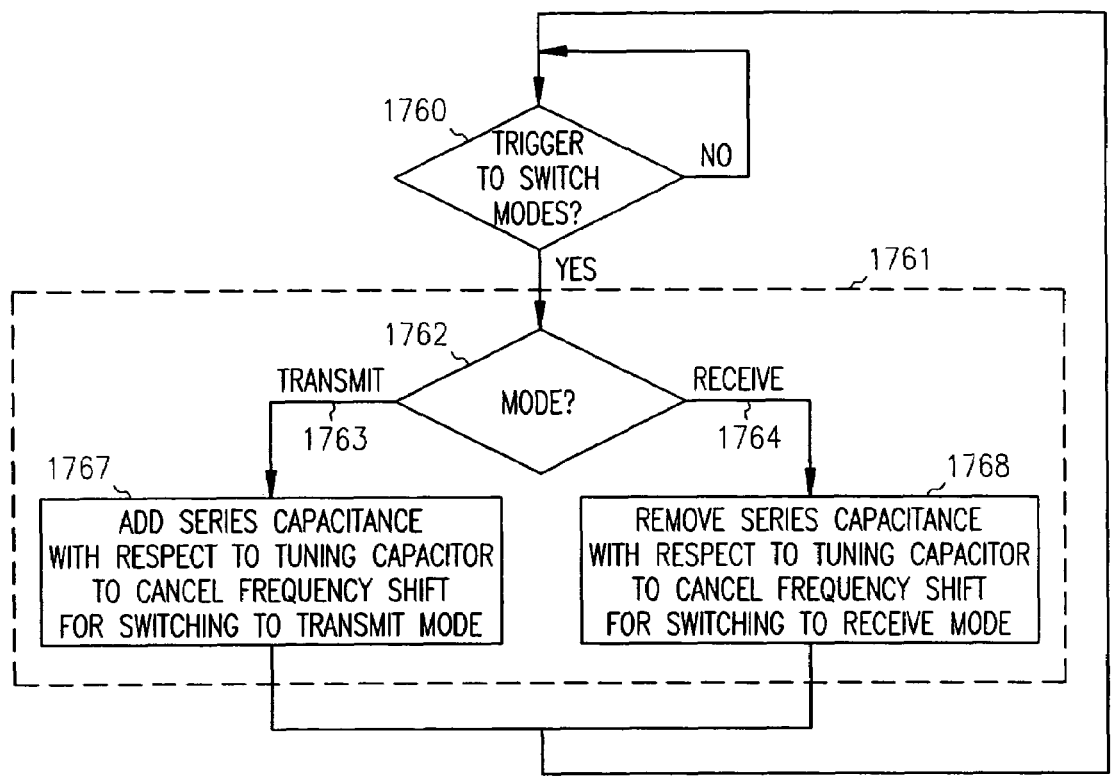

FIG. 17C illustrates a process for switching communication modes in a wireless hearing aid, according to a series capacitor embodiment of the present subject matter. In this embodiment, the frequency shift canceling component includes a series capacitance with respect to the tuning capacitor. At 1760, it is determined whether a trigger to switch modes has occurred. When a trigger to switch modes occurs, the process proceeds to 1762, where it is determined whether the mode is being switched to a transmit mode, represented at 1763, or to a receive mode, represented at 1764. When the mode is being switched to the transmit mode 1763, the process proceeds to 1767, where a series capacitance with respect to the tuning capacitor is added to cancel the frequency shift associated with switching from the receive mode to the transmit mode. When the mode is being switched to the receive mode 1764, the process proceeds to 1768, where the series capacitance with respect to the tuning capacitor is removed to cancel the frequency shift associated with switching from the transmit mode to the receive mode.

Figure 17D:
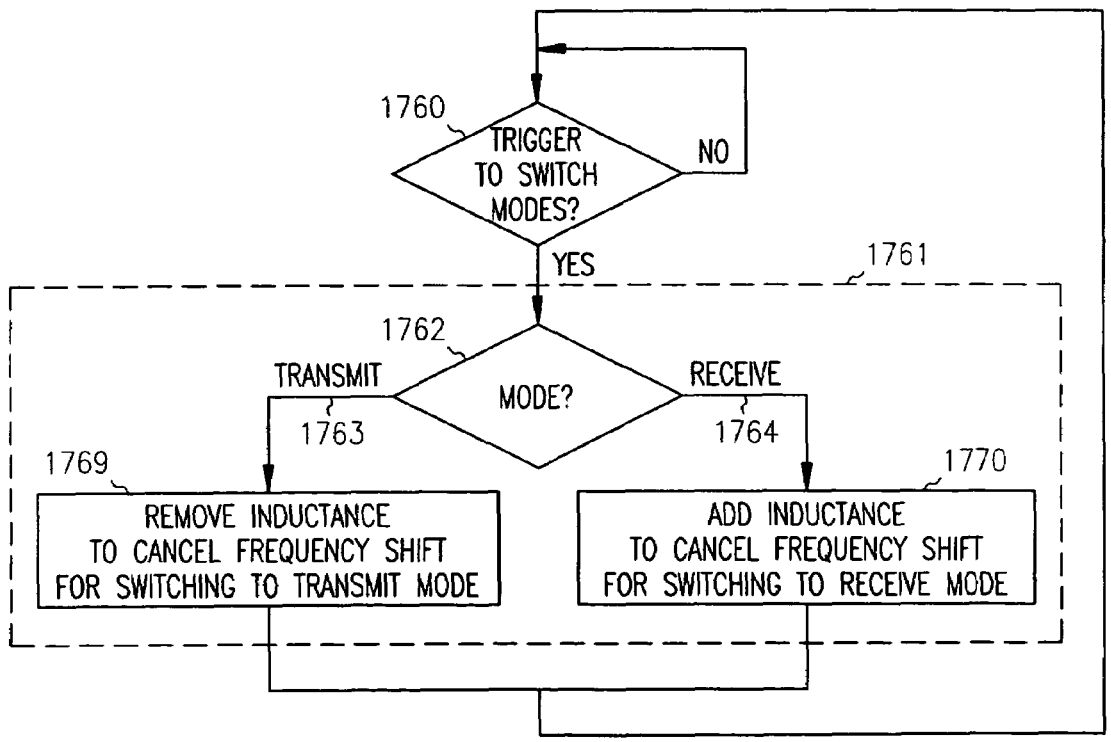

FIG. 17D illustrates a process for switching communication modes in a wireless hearing aid, according to a center-tapped inductor embodiment of the present subject matter. In this embodiment, the frequency shift canceling component includes a removable inductance. At 1760, it is determined whether a trigger to switch modes has occurred. When a trigger to switch modes occurs, the process proceeds to 1762, where it is determined whether the mode is being switched to a transmit mode, represented at 1763, or to a receive mode, represented at 1764. When the mode is being switched to the transmit mode 1763, the process proceeds to 1769, where inductance is removed to cancel the frequency shift associated with switching from the receive mode to the transmit mode. When the mode is being switched to the receive mode 1764, the process proceeds to 1770, where inductance is added to cancel the frequency shift associated with switching from the transmit mode to the receive mode. In various embodiment that use a center-tapped coil having a first inductive portion and a second inductive portion, the frequency shift canceling component includes the second inductive portion, which is removed from the resonant circuit during the transmit mode and incorporated in the resonant circuit during the receive mode.

One of ordinary skill in the art will understand, upon reading and comprehending this disclosure, that the present subject matter is capable of being incorporated in a variety of near-field communication systems and technology that use such near-field communication systems such as hearing aids. For example, the present subject mater is capable of being used in hearing aids such as in-the-ear, half-shell and in-the-canal styles of hearing aids, as well as for behind-the-ear hearing aids. Furthermore, one of ordinary skill in the art will understand, upon reading and comprehending this disclosure, the method aspects of the present subject matter using the figures presented and described in detail above.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments, and other embodiments will be apparent to those of skill in the art upon reviewing the above description. The scope of the present subject matter should be determined with reference to the appended claims, along with the full scope of equivalents to which such claims are entitled.

What is claimed is:

1. A communication system, comprising:
   an antenna with a resonant circuit, the resonant circuit including an inductive coil connected to a tuning capacitor;
   means to selectively drive the resonant circuit during a transmit mode;
   means to selectively receive an induced signal in the resonant circuit during a receive mode; and
   means to selectively include a frequency shift canceling component in the resonant circuit to provide a first resonance frequency in the resonant circuit in the transmit mode and a second resonance frequency in the resonant circuit in the receive mode such that the first resonance frequency and the second resonance frequency are approximately equal, wherein the means to selectively include a frequency shift canceling component in the resonant circuit includes means to selectively exclude a predetermined parallel capacitance with respect to the tuning capacitor when switching from the receive mode to the transmit mode, and to selectively include the predetermined parallel capacitance with respect to the tuning capacitor when switching from the transmit mode to the receive mode.

2. The communication system of claim 1, further comprising:
   an external elements portion comprising the antenna, wherein the inductive coil is connected to the tuning capacitor at a signal pickup node; and
   an integrated circuit portion comprising a signal processing circuit and a transmit-receive (TR) switch for switching between the transmit mode and the receive mode, wherein the integrated circuit portion comprises:
      the means to selectively drive the resonant circuit during the transmit mode;
      the means to selectively receive the induced signal in the resonant circuit during the receive mode, wherein the means to selectively receive includes an amplifier having an input capacitance; and
      the means to selectively include the frequency shift cancelling component in the resonant circuit,
   wherein the external elements portion further comprises a blocking capacitor connected to the signal pickup node for protecting the integrated circuit portion from high voltages from the antenna element in a receive mode, and wherein the TR switch of the integrated circuit portion functions to configure the antenna in series in the transmit mode and in parallel in the receive mode, and further functions to protect the integrated circuit portion from large voltages generated at the node during the transmit mode by shunting the input capacitance of the amplifier.

3. A communication system, comprising:

an antenna with a resonant circuit, the resonant circuit including an inductive coil connected to a tuning capacitor;

means to selectively drive the resonant circuit during a transmit mode;

means to selectively receive an induced signal in the resonant circuit during a receive mode; and means to selectively include a frequency shift canceling component in the resonant circuit to provide a first resonance frequency in the resonant circuit in the transmit mode and a second resonance frequency in the resonant circuit in the receive mode such that the first resonance frequency and the second resonance frequency are approximately equal, wherein the means to selectively include a frequency shift canceling component in the resonant circuit includes means to selectively include a predetermined series capacitance with respect to the tuning capacitor when switching from the receive mode to the transmit mode, and to selectively exclude the predetermined series capacitance with respect to the tuning capacitor when switching from the transmit mode to the receive mode.

4. A communication system, comprising:

an antenna with a resonant circuit, the resonant circuit including an inductive coil connected to a tuning capacitor;

means to selectively drive the resonant circuit during a transmit mode;

means to selectively receive an induced signal in the resonant circuit during a receive mode; and means to selectively include a frequency shift canceling component in the resonant circuit to provide a first resonance frequency in the resonant circuit in the transmit mode and a second resonance frequency in the resonant circuit in the receive mode such that the first resonance frequency and the second resonance frequency are approximately equal, wherein the means to selectively include a frequency shift canceling component in the resonant circuit includes means to selectively exclude a predetermined inductance from the resonant circuit of the antenna when switching from the receive mode to the transmit mode, and to selectively include the predetermined inductance from the resonant circuit of the antenna when switching from the transmit mode to the receive mode.

5. A communication system, comprising:

an antenna element having a first terminal, a second terminal and a node, the antenna element including a resonant circuit, the resonant circuit including an inductive coil connected between the first terminal and the node and a tuning capacitor connected between the second terminal and the node;

a DC blocking capacitor connected to the node of the antenna element;

an amplifier to be connected to the node of the antenna through the DC blocking capacitor during a receive mode to receive a first communication signal induced in the inductive coil of the resonant circuit;

a driver to be connected to at least one of the first terminal and the second terminal of the antenna element in a transmit mode to energize the inductive coil of the resonant circuit with a second communication signal;

a frequency shift canceling component to be selectively included in the resonant circuit of the antenna element, the frequency shift canceling component having a predetermined value; and a transmit-receive (TR) switch responsive to a control signal to include the frequency shift canceling component in the resonant circuit when switching to a first one of the transmit and receive modes, and to exclude the frequency shift canceling component in the resonant circuit when switching to a second one of the transmit and receive modes such that a first resonance frequency of the resonant circuit during the receive mode and a second resonance frequency of the resonant circuit during the transmit mode are approximately equal.

6. The communication system of claim 5, wherein the frequency shift canceling component includes a compensation capacitor selectively connected in parallel with respect to the tuning capacitor in the receive mode.

7. The communication system of claim 5, wherein the frequency shift canceling component includes a compensation capacitor selectively connected in series with respect to the tuning capacitor in the transmit mode.

8. The communication system of claim 5, wherein the frequency shift canceling component includes a compensation inductor selectively connected in series with respect to the inductive coil and the tuning capacitor in the receive mode.

9. The communication system of claim 8, wherein the compensation inductor and the inductive coil are formed on a single core.

10. The communication system of claim 5, wherein the communication system is incorporated in a wireless hearing aid and is adapted to inductively communicate with inductive devices.

11. The communication system of claim 5, further comprising:

an external elements portion comprising the blocking capacitor and the antenna element, wherein the inductive coil is connected to the tuning capacitor at a signal pickup node; and an integrated circuit portion comprising a signal processing circuit, the TR switch for switching between the transmit mode and the receive mode, the amplifier, and the driver, the amplifier having an input capacitance, wherein the TR switch of the integrated circuit portion functions to configure the antenna element in series in the transmit mode and in parallel in the receive mode, and further functions to protect the integrated circuit portion from large voltages generated at the node during the transmit mode by shunting the input capacitance of the amplifier, wherein the blocking capacitor is adapted to protect the integrated circuit portion from high voltages from the antenna element in a receive mode.

12. A communication system, comprising:

an antenna element having a first terminal, a second terminal and a node, the antenna element including a resonant circuit, the resonant circuit including an inductive coil connected between the first terminal and the node and a tuning capacitor connected between the second terminal and the node;

a DC blocking capacitor connected to the node of the antenna element;

an amplifier to be connected to the node of the antenna through the DC blocking capacitor during a receive mode to receive a first communication signal induced in the inductive coil of the resonant circuit;

a driver to be connected to at least one of the first terminal and the second terminal of the antenna element in a transmit mode to energize the inductive coil of the resonant circuit with a second communication signal;

a frequency shift canceling component to be selectively included in the resonant circuit of the antenna element, the frequency shift canceling component having a predetermined value; and a transmit-receive (TR) switch responsive to a control signal to include the frequency shift canceling component in the resonant circuit when switching to a first one of the transmit and receive modes, and to exclude the frequency shift canceling component in the resonant circuit when switching to a second one of the transmit and receive modes such that a first resonance frequency of the resonant circuit during the receive mode and a second resonance frequency of the resonant circuit during the transmit mode are approximately equal, wherein:

the frequency shift canceling component includes a compensation capacitor selectively connected in parallel with respect to the tuning capacitor in the receive mode;

the compensation capacitor is connected to the node of the antenna element; and the TR switch includes:
  means to pull the first terminal and the second terminal of the antenna element to a reference potential during the receive mode; and
  a transistor connected between the compensation capacitor and the reference potential, the transistor being responsive to the control signal to pull the compensation capacitor to the reference potential during the receive mode.

13. A communication system, comprising:

an antenna element having a first terminal, a second terminal and a node, the antenna element including a resonant circuit, the resonant circuit including an inductive coil connected between the first terminal and the node and a tuning capacitor connected between the second terminal and the node;

a DC blocking capacitor connected to the node of the antenna element;

an amplifier to be connected to the node of the antenna through the DC blocking capacitor during a receive mode to receive a first communication signal induced in the inductive coil of the resonant circuit;

a driver to be connected to at least one of the first terminal and the second terminal of the antenna element in a transmit mode to energize the inductive coil of the resonant circuit with a second communication signal;

a frequency shift canceling component to be selectively included in the resonant circuit of the antenna element, the frequency shift canceling component having a predetermined value; and a transmit-receive (TR) switch responsive to a control signal to include the frequency shift canceling component in the resonant circuit when switching to a first one of the transmit and receive modes, and to exclude the frequency shift canceling component in the resonant circuit when switching to a second one of the transmit and receive modes such that a first resonance frequency of the resonant circuit during the receive mode and a second resonance frequency of the resonant circuit during the transmit mode are approximately equal, wherein:

the frequency shift canceling component includes a compensation capacitor selectively connected in series with respect to the tuning capacitor in the transmit mode;

the compensation capacitor is connected to a first one of the first and second terminals of the antenna element, and in series with the inductive coil and the tuning capacitor; and the TR switch includes:
  means to pull a second one of the first and second terminals of the antenna element to a reference potential during the receive mode; and
  a transistor connected between the reference potential and a node between the compensation capacitor and one of the inductive coil and the tuning capacitor, wherein the compensation capacitor is connected between the transistor and the first one of the first and second terminals of the antenna element, the transistor being responsive to the control signal to pull the node to the reference potential during the receive mode such that the compensation capacitor is removed from the resonant circuit during the receive mode.

14. A communication system, comprising:

an antenna element having a first terminal, a second terminal and a node, the antenna element including a resonant circuit, the resonant circuit including an inductive coil connected between the first terminal and the node and a tuning capacitor connected between the second terminal and the node;

a DC blocking capacitor connected to the node of the antenna element;

an amplifier to be connected to the node of the antenna through the DC blocking capacitor during a receive mode to receive a first communication signal induced in the inductive coil of the resonant circuit;

a driver to be connected to at least one of the first terminal and the second terminal of the antenna element in a transmit mode to energize the inductive coil of the resonant circuit with a second communication signal;

a frequency shift canceling component to be selectively included in the resonant circuit of the antenna element, the frequency shift canceling component having a predetermined value; and a transmit-receive (TR) switch responsive to a control signal to include the frequency shift canceling component in the resonant circuit when switching to a first one of the transmit and receive modes, and to exclude the frequency shift canceling component in the resonant circuit when switching to a second one of the transmit and receive modes such that a first resonance frequency of the resonant circuit during the receive mode and a second resonance frequency of the resonant circuit during the transmit mode are approximately equal, wherein:

the inductive coil includes a center-tapped coil having a first coil portion and a second coil portion separated by a tap node, a first one of the first and second terminals of the antenna element being connected to the tap node such that a drive current flows through the first coil portion during the transmit mode;

the TR switch includes:
  means to pull a second one of the first and second terminals of the antenna element to a reference potential during the receive mode; and
  a transistor connected between the second coil portion and the reference potential, the transistor being responsive to the control signal to pull the second coil portion to the reference potential during the receive mode such that both the first coil portion and the second coil portion are included in the resonant circuit of the antenna element during the receive mode.

15. A hearing aid, comprising:
a hearing aid receiver to present sound to an ear;
a microphone system to receive acoustic signals;
an antenna element to transmit and receive inductive signals, the antenna element including:
  a first terminal, a second terminal and a node; and
  a resonant circuit, including an inductive coil connected between the first terminal and the node, and a tuning capacitor connected between the second terminal and the node;
a DC blocking capacitor connected to the node of the antenna element;
a frequency shift canceling component; and
signal processing circuitry connected to the microphone system to process received acoustic signals and present the processed signals to the hearing aid receiver, and connected to the antenna element to process the received inductive signals, the signal processing circuitry including a transmit-receive (TR) switch responsive to a control signal to include the frequency shift canceling component in the resonant circuit when switching to a first one of the transmit and receive modes, and to exclude the frequency shift canceling component in the resonant circuit when switching to a second one of the transmit and receive modes.

16. The hearing aid of claim 15, wherein the TR switch further includes:
  a first portion to selectively connect at least one antenna terminal to a driver output during a transmit mode and to a reference potential during a receive mode;
  a second portion to selectively connect an amplifier input to a node of the antenna through the DC blocking capacitor during the receive mode and to pull a node between the DC blocking capacitor and the amplifier input to the reference potential during the transmit mode.

17. The hearing aid of claim 15, wherein the frequency shift canceling component has a predetermined value calculated to replace a DC blocking capacitor value in determining a resonance frequency in the resonant circuit.

18. The hearing aid of claim 15, wherein:
  the frequency shift canceling component includes a predetermined capacitance; and
  the TR switch includes a transistor to selectively exclude the predetermined capacitance from the resonant circuit of the antenna when switching from the receive mode to the transmit mode, and to selectively connect the predetermined capacitance in parallel with the tuning capacitor of the antenna when switching from the transmit mode to the receive mode.

19. The hearing aid of claim 15, wherein
  the frequency shift canceling component includes a predetermined capacitance; and
  the TR switch includes a transistor to selectively connect the predetermined capacitance in series with respect to the tuning capacitor of the antenna when switching from the receive mode to the transmit mode, and to selectively exclude the predetermined capacitance from the resonant circuit of the antenna when switching from the transmit mode to the receive mode.

20. The hearing aid of claim 15, wherein:
  the frequency shift canceling component includes a predetermined compensation inductor; and
  the TR switch includes a transistor to selectively exclude the predetermined compensation inductance from the resonant circuit of the antenna when switching from the receive mode to the transmit mode, and to selectively include the predetermined compensation inductance from the resonant circuit of the antenna when switching from the transmit mode to the receive mode.

21. The hearing aid of claim 15, further comprising:
an integrated circuit portion and an external elements portion, the integrated circuit portion including the signal processing circuitry with the TR switch, the signal processing circuitry including an amplifier with an input capacitance, the external elements portion including the antenna element and the blocking capacitor, wherein the blocking capacitor is adapted to protect the integrated circuit portion from high voltages from the antenna element in a receive mode,
wherein the TR switch of the integrated circuit portion functions to configure the antenna element in series in the transmit mode and in parallel in the receive mode, and further functions to protect the integrated circuit portion from large voltages generated at the node during the transmit mode by shunting the input capacitance of the amplifier.

22. A hearing aid, comprising:
a hearing aid receiver to present sound to an ear;
a microphone system to receive acoustic signals;
an antenna element to transmit and receive inductive signals, the antenna element including:
  a first terminal, a second terminal and a node; and
  a resonant circuit, including an inductive coil connected between the first terminal and the node, and a tuning capacitor connected between the second terminal and the node;
a DC blocking capacitor connected to the node of the antenna element;
a frequency shift canceling component; and
signal processing circuitry connected to the microphone system to process received acoustic signals and present the processed signals to the hearing aid receiver, and connected to the antenna element to process the received inductive signals, the signal processing circuitry including a transmit-receive (TR) switch responsive to a control signal to include the frequency shift canceling component in the resonant circuit when switching to a first one of the transmit and receive modes, and to exclude the frequency shift canceling component in the resonant circuit when switching to a second one of the transmit and receive modes,
wherein the frequency shift canceling component has a predetermined value calculated to replace a DC blocking capacitor value in determining a resonance frequency in the resonant circuit, and the predetermined value of the frequency shift canceling component is calculated to further compensate for an inductance change attributable to a difference in a first current flow through the inductive coil in the transmit mode and a second current flow through the inductive coil in the receive mode.

23. A method for switching modes in a wireless communication system having a resonant circuit in an antenna element, comprising:
determining whether a trigger to switch modes has occurred; and
for one of switching from a transmit mode to a receive mode or switching from the receive mode to the transmit mode, selectively incorporating a frequency shift canceling component to compensate for a resonant frequency shift in the resonant circuit,
wherein selectively incorporating a frequency shift canceling component to compensate for a resonant frequency shift in the resonant circuit includes compensating for a DC bypass capacitor that is a substantial component for determining resonance frequency in the transmit mode and a relatively insubstantial component for determining resonance frequency in the receive mode.

24. The method of claim 23, wherein selectively incorporating a frequency shift canceling component to compensate for a resonant frequency shift in the resonant circuit includes compensating for an inductance change caused by a current change through an inductive coil.

25. The method of claim 23, wherein selectively incorporating a frequency shift canceling component to compensate for a resonant frequency shift in the resonant circuit includes connecting a predetermined capacitance in parallel with respect to the tuning capacitor of the antenna when switching from the transmit mode to the receive mode.

26. The method of claim 23, wherein selectively incorporating a frequency shift canceling component to compensate for a resonant frequency shift in the resonant circuit includes connecting a predetermined capacitance is series with respect to a tuning capacitor of the antenna when switching from the receive mode to the transmit mode.

27. The method of claim 23, wherein selectively incorporating a frequency shift canceling component to compensate for a resonant frequency shift in the resonant circuit includes connecting a predetermined inductance in series with the tuning capacitor and the inductive coil when switching from the transmit mode to the receive mode.

28. A device for switching modes in a wireless communication system having a resonant circuit in an antenna element, comprising:
  means for determining whether a trigger to switch modes has occurred; and
  for one of switching from a transmit mode to a receive mode or switching from the receive mode to the transmit mode, means for selectively incorporating a frequency shift canceling component to compensate for a resonant frequency shift in the resonant circuit, wherein the means for selectively incorporating the frequency shift canceling component includes means for compensating for a DC bypass capacitor that is a substantial component for determining resonance frequency in the transmit mode and a relatively insubstantial component for determining resonance frequency in the receive mode.

29. The device of claim 28, wherein the means for selectively incorporating a frequency shift canceling component to compensate for a resonant frequency shift in the resonant circuit includes means for compensating for an inductance change caused by a current change through an inductive coil.

* * * * *

UNITED STATES PATENT AND TRADEMARK OFFICE
CERTIFICATE OF CORRECTION

PATENT NO.       : 7,515,881 B2  
APPLICATION NO.  : 10/723855  
DATED            : April 7, 2009  
INVENTOR(S)      : Essabar Page 1 of 1

It is certified that error appears in the above-identified patent and that said Letters Patent is hereby corrected as shown below:

In column 23, line 19, in Claim 26, delete "is" and insert -- in --, therefor.

Signed and Sealed this

Thirtieth Day of June, 2009

JOHN DOLL  
*Acting Director of the United States Patent and Trademark Office*